United States Patent [19]

Kawaguchi et al.

[11] Patent Number: 5,009,986
[45] Date of Patent: Apr. 23, 1991

[54] NAPHTHALOCYANINE BASED COMPOUND AND OPTICAL RECORDING MEDIUM CONTAINING THE SAME

[75] Inventors: Takayuki Kawaguchi, Hachioji; Takashi Shiro, Hino; Kaoru Iwata, Hachioji; Takahiro Daido, Hino, all of Japan

[73] Assignee: Teijin Limited, Osaka, Japan

[21] Appl. No.: 466,545

[22] Filed: Jan. 17, 1990

[30] Foreign Application Priority Data

Jan. 17, 1989 [JP] Japan .................................... 1-5888
Feb. 22, 1989 [JP] Japan .................................... 1-40325

[51] Int. Cl.$^5$ ........................ G03C 1/00; G03C 1/492; C09B 47/04
[52] U.S. Cl. .................................... 430/495; 430/270; 430/271; 430/945; 540/128; 540/131; 540/139; 540/140; 428/64; 346/135.1
[58] Field of Search ............... 430/270, 271, 495, 945; 540/128, 131, 139, 140

[56] References Cited

U.S. PATENT DOCUMENTS

| | | |
|---|---|---|
| 3,475,760 | 10/1969 | Carlson .................................... 346/1 |
| 4,719,615 | 1/1988 | Feyrer et al. .................... 369/284 |
| 4,725,525 | 2/1988 | Kenny et al. .................... 430/270 |

FOREIGN PATENT DOCUMENTS

| | | |
|---|---|---|
| 0320834 | 10/1988 | European Pat. Off. . |
| 0323678 | 12/1988 | European Pat. Off. . |
| 0331438 | 9/1989 | European Pat. Off. . |
| 60-184565 | 9/1985 | Japan . |
| 61-25886 | 2/1986 | Japan . |
| 61-177288 | 8/1986 | Japan . |
| 61-232448 | 10/1986 | Japan . |
| 63-57288 | 3/1988 | Japan . |
| 63-119036 | 5/1988 | Japan . |

OTHER PUBLICATIONS

Japan Chemical Society, 57th Autumn Conference, Preprint, 10414, p. 642.
Mol. Cryst. Liq, Cryst., 112, 345–358 1984.
J. Chem. Soc., Perkin Trans., 1 (8), 2453–2458, 1988.
Japan Chemical Society, 57th Autumn Conference, Preprint, 1D414, p. 642.
Am. Chem. Soc., 106, 7404–7410, 1984.
Japanese J. Appl. Phys., 22, (2), 340–343, 1983.
Appl. Phys. Lett., 39 (9), 718, 1981.
J. Appl. Phys., 60, 2932 (1986).

Primary Examiner—Paul R. Michl
Assistant Examiner—Ashley Pezzner
Attorney, Agent, or Firm—Sughrue, Mion, Zinn, Macpeak & Seas

[57] ABSTRACT

A novel naphthalocyanine based compound having Si atom as a central metal and groups selected from

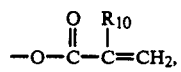

CN, and —CH=CH$_2$ which is bonded to said Si atom via a specific hydrocarbon group, by which solubility in an organic solvent, compatibility with a polymeric substance and durability against an infrared ray are improved. The compound may be incorporated into a polymeric substance layer to form a recording layer of an optical recording medium.

12 Claims, 8 Drawing Sheets

WAVE NUMBER

WAVE LENGTH (nm)

NAPHTHALOCYANINE BASED COMPOUND AND OPTICAL RECORDING MEDIUM CONTAINING THE SAME

This invention provides novel naphthalocyanine based compounds soluble in an organic solvent and compatible with various polymers.

This invention further provides an optical recording medium with excellent durability, which comprises a recording layer composed of a polymeric layer incorporating said novel naphthalocyanine based compound as a component which absorbs a light and converts it into heat.

BACKGROUND OF THE INVENTION

Recently, an optical recording medium utilizing a semiconductor laser has been put to practical use. Since the wave length radiated from a semiconductor laser is in the range of near infrared ray at the present time, it is inevitable to use a material which strongly absorbs the near infrared ray for recording or reading with ray semiconductor laser.

As for one representative example of an organic dye absorbing the near infrared ray, there are mentioned naphthalocyanines derivatives. Since the naphthalocyanine having Cu, Co, Ni, Zn, Vo, Mg, Al, Mn, In, Ge or hydrogen as a central element of the naphthalocyanine ring generally have poor solubility in an organic solvent, it has been necessary to use a dry process such as a vacuum vapor deposition method for forming a thin layer thereof (Mol. Cryst. Liq. Cryst., 112, 345–358, 1984).

To improve the solubility thereof, there is proposed a method to introduce an alkyl group into the naphthalocyanine ring as a substituent (J. Chem. Soc., Perkin Trans. 1, (8), 2453–2458, 1988, Japan Laid Open Patent Application 60-184565, ibid 61-25886). This method however, has some disadvantages such as (i) many steps are required to synthesize the naphthalocyanine derivative, and
(ii) an association of the naphthalocyanine derivative occurs in a solvent at high concentration and the strength of absorbance at the near infrared region decreases thereby (Japan Chemical Society, 57th Autumn Conference, preprint, 1D414, P.642).

As for other proposals to improve the solubility thereof, there is proposed a method wherein a polyvalent metal atom having 3 or more valence such as silicon and germanium is used as the central metal atom of the naphthalocyanine and a binding site of the polyvalent metal atom which is not used for binding with the naphthalocyanine skeleton is bound with an alkali group or aryl group (J. Am. Chem. Soc., 106, 7404–7410, 1984, U.S. Pat. No. 4,725,525). Of these, the especially preferred central metal is silicon. But when the naphthalocyanine which is substituted at its central metal is mixed with a polymer capable of forming a film and then used to form a thin film, there appears a tendency for phase-separation to occur between the naphthalocyanine and the polymer in accordance with the concentration increase of the naphthalocyanine or with the lapse of time.

Accordingly, there is further proposed a method wherein a transition metal or Al, Ge, Sn, Ga or In is used as the central metal of the naphthalocyanine and the metal is coordinately bound with a polymer capable of being bound coordinately, whereby to avoid the phase separation between the naphthalocyanine and the polymer (Japan Laid Open Patent Application 61-232448).

This method has disadvantages such as (i) the concentration of the naphthalocyanine in the naphthalocyanine/polymer thin film can not be increased,
(ii) the phase-separation between the naphthalocyanine and the polymer occurs at high temperature, and
(iii) the variety of the polymer used in this method is limited.

On the other hand, there is proposed a naphthalocyanine/polymer thin layer in which the naphthalocyanine is covalently bound to the polymer (Japan Laid Open Patent Application 61-177288). This material is made, by using dihydroxysilicon naphthalocyanine as a starting material, through a two step reaction as shown in the following reaction equation;

$SiNc(OH)_2 + 2(CH_3)_2SiCl_2 \longrightarrow$

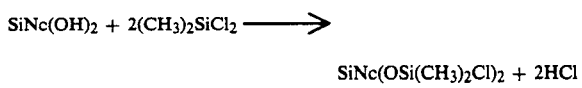

$SiNc(OSi(CH_3)_2Cl)_2 + 2HCl$ $SiNc(OSi(CH_3)_2Cl)_2 + 2ROH \longrightarrow$

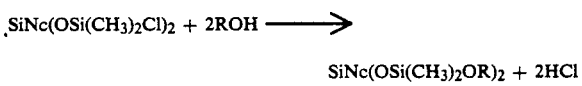

$SiNc(OSi(CH_3)_2OR)_2 + 2HCl$ wherein Nc represents naphthalocyanine skeleton; $SiNc(OH)_2$ represents dihydroxysilicon naphthalocyanine; $(CH_3)_2SiCl_2$ represents dimethyldichlorosilane; ROH represents polymer having hydroxy groups These soluble naphthalocyanines may be coated to form a highly reflective layer, and a pit can be formed by radiation of a laser beam. Utilizing such property, there have been proposed many writable optical recording media using a soluble naphthalocyanine which is recorded by forming a pit. Although the above naphthalocyanine dye which is substituted with a hydrophobic group such as an alkyl group and aryl group can be formed into a layer as it is, it is not economical to use the dye as it is for the recording medium because the dye is very expensive. The application of the naphthalocyanine dye mentioned above is limited to a highly hydrophobic polymer because of its hydrophobicity when it is intended to use the dye by mixing with the another polymer Further, since this dye is easily sublimated and has relatively low heat-durability among the naphthalocyanine compounds, the record of the optical recording medium may be damaged even with a low energy level laser beam during the reading process.

SUMMARY OF THE INVENTION

This invention relates to a naphthalocyanine based compound having a Si atom as its central metal and being linked at the Si atom with groups which impart solubility in an organic solvent, compatibility with a polymeric substance and/or crosslinkability with the polymeric substance to the naphthalocyanine based compound This invention also relates to an optical recording medium comprising a recording layer composed of a polymeric layer containing said compound.

FI. 7 shows an IR spectrum of bis(3-cyanopropyldimethylsiloxy)silicon naphthalocyanine.

Figure 8:
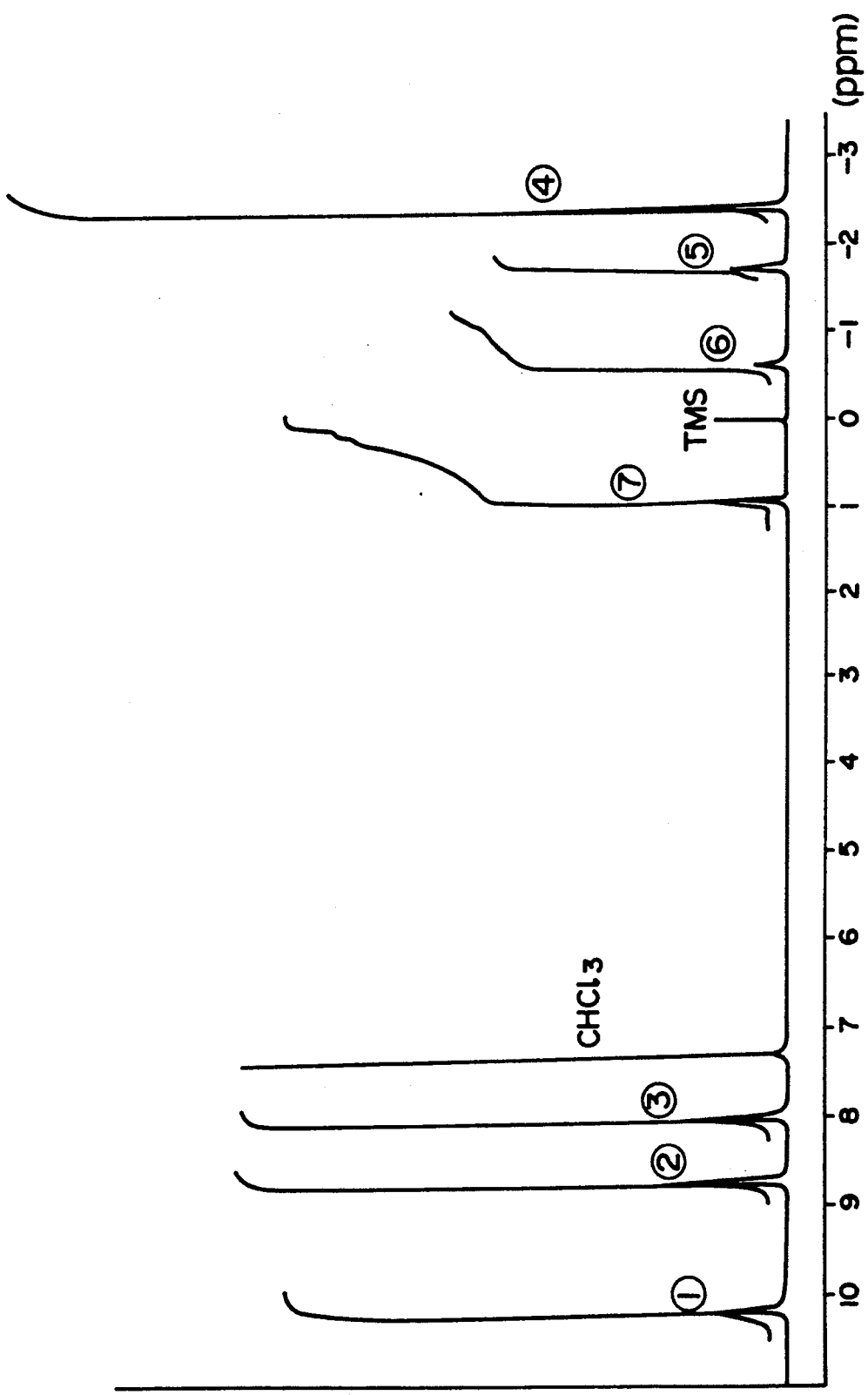

FIG. 8 shows a NMR spectrum of bis(3-cyanopropyldimethylsiloxy)silicon naphthalocyanine.

Figure 9:
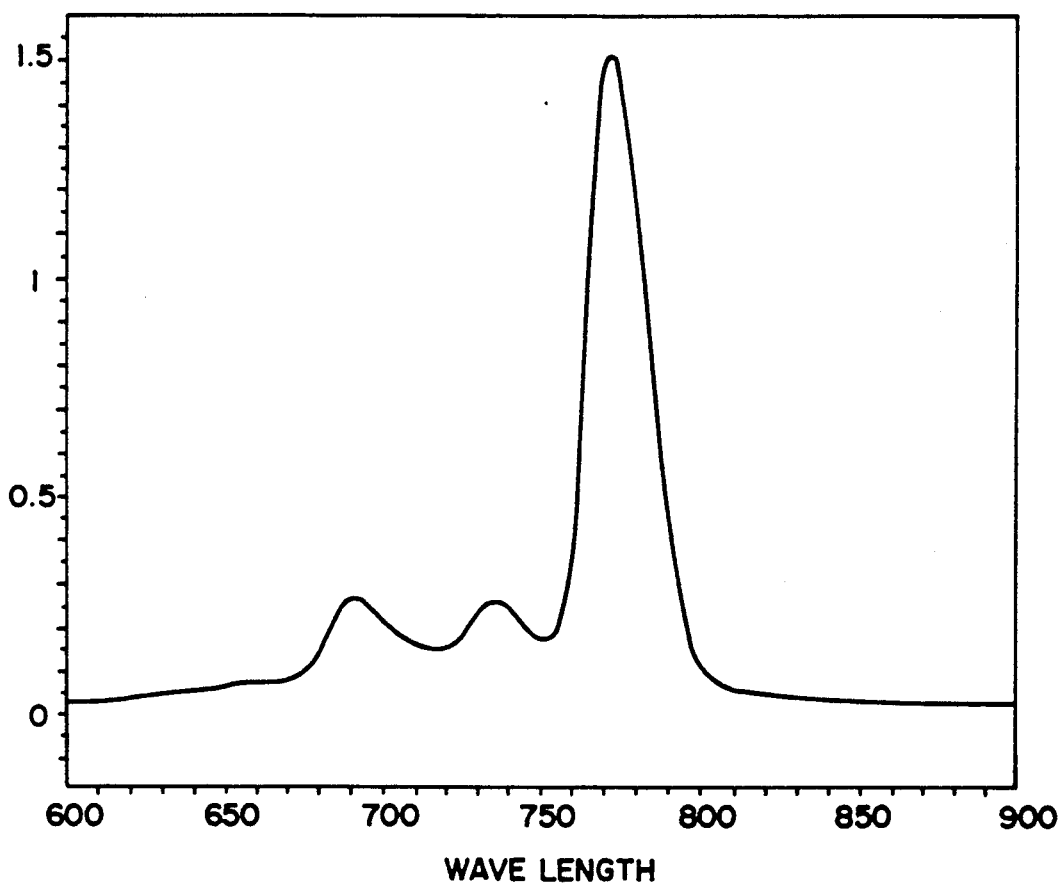

FIG. 9 shows a near infrared-visible ray absorbance spectrum of bis(3-cyanopropyldimethylsiloxy)silicon naphthalocyanine.

PREFERRED EMBODIMENT OF THE INVENTION

This invention provides naphthalocyanine based compounds having an absorbance in the near infrared region and a high solubility in a solvent, which allows one to form a homogeneous coating when applied solely as it is or in combination with other material.

This invention further provides an optical recording medium with superior durability containing the above dye compound as an ingredient functioning to absorb light and convert it into heat.

The naphthalocyanine based compound according to the invention is characterized in that:

(i) it is excellently stable to heat and light within a range from ultraviolet ray to near infrared, (ii) it has an outstandingly strong and sharp absorbance of light in the near infrared region, and, (iii) it has superior solubility in a solvent.

Using the naphthalocyanine based compound as it is or in a form blended in a polymeric substance to form a layer and utilizing the layer as an information storage layer, there is provided an optical recording medium with superior heat resistance, light resistance and high reflection, which is further characterized by a lower write threshold, that is, the low energy level required for recording.

A naphthalocyanine based compound according to this invention is expressed by the following formula [I]

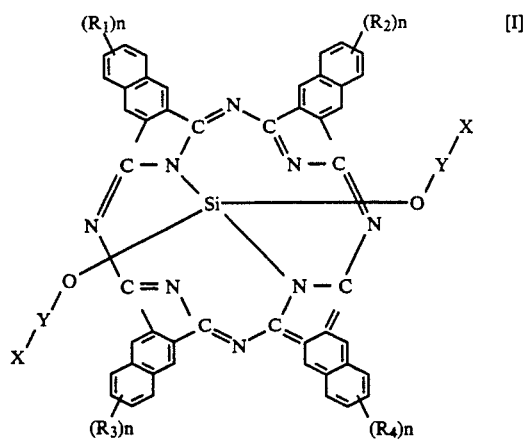

Wherein X represents a group selected from a group consisting of

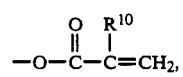

—CN and —CH=CH$_2$; in which $R^{10}$ represents hydrogen atom or methyl group;

Y represents a divalent group selected from a group consisting of (1) a saturated aliphatic hydrocarbon group having 2-20 carbon atoms, saturated alicyclic hydrocarbon group having 5-6 carbon atoms, aromatic hydrocarbon group having 6-10 carbon atoms and hydrocarbon group formed by binding the above mentioned groups with each other and having 2-20 total carbon atoms, each optionally substituted with a group selected from a halogen atom and lower alkyloxy group; which may be substituted with 1 or 2 substituents of X;

(2) a group expressed by the formula —$R_{11}$—($O$—$R_{11}$)$_{m1}$ or the group —$R_{11}$—($O$—$R_{11}$)$_{m1}$ which is further bound with the saturated alicyclic hydrocarbon group or the aromatic hydrocarbon group defined in above (1); in which $R_{11}$ represents straight chain or branched alkylene group having 2-4 carbon atoms and m1 is an integer of 1-20;

(3) a group expressed by the formula

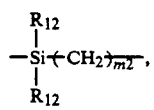

in which $R_{12}$ represents hydrocarbon group having 1-6 carbon atoms; $m_2$ represents an integer of 1-20; and (4) a group expressed by the formula

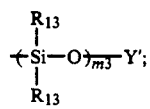

in which $R_{13}$ represents the same as defined for $R_{12}$; $m_3$ represents the same as defined for $m_1$; Y' represents a group selected from a group consisting of (1), (2) and (3) defined above for Y;

provided that

Y represents phenylene group when X represents —CH=CH$_2$;

R$_1$, R$_2$, R$_3$ and R$_4$ are identical or different and represent hydrogen atom, each straight chain or branched alkyl group, alkoxy group or alkylsilyl group, each having 1–18 carbon atoms; and n represents an integer of 1–4.

X is a group which exhibits a function controlling the association of the dye compound and enhancing the compatibility of the compound in a polymeric substance, when the compound is incorporated into the polymeric substance layer.

R$_{10}$ represents hydrogen atom or methyl group, preferably hydrogen atom.

Y is a linking group which links the group X of the compound mentioned above to a naphthalocyanine skeleton having a Si atom as the central metal atom and having a function of mainly absorbing the light.

As for Y, there are mentioned first a divalent group selected from a group consisting of a saturated aliphatic hydrocarbon group having 2–20 carbon atoms, saturated alicyclic hydrocarbon group having 5–6 carbon atoms, aromatic hydrocarbon group having 6–10 carbon atoms and hydrocarbon group formed by binding the above mentioned groups with each other and having 2–20 total carbon atoms, each optionally substituted with a group selected from a halogen atom and lower alkyloxy; which may be substituted with 1 or 2 substituents of X.

The divalent saturated aliphatic hydrocarbon group has 2–20, preferably 2–10, more preferably 2–5 carbon atoms, and represents, for example ethylene, 1,4-butylene, 1,5-pentylene, 1,6-hexylene, 1,8-octylene, 1,12-dodecylene, 1,16-hexadecylene, 1,18-octadecylene, 1,2-propylene, 1,2-butylene, 2,2-dimethyl-1,3-propylene, 1-methyl-1,2-propylene, 3-methyl-1,2-butylene, 1,4-octylene, 4-butyl-1,8-octylene, 5-butyl-1,10-dodecylene, 1,6-dodecylene or 1-hexyl-1,11-undecylene.

Of these, a lower alkylene having 2–10 carbon atoms with low hydrophobicity such as ethylene or 1,2-propylene is preferred when the polymeric substance has polarity.

A higher alkylene having about 11–20 carbon atoms with high hydrophobicity such as 1,6-dodecylene or 1-hexyl-1,11-undecylene; however, may be preferred when the polymeric substance shows non-polarity.

The divalent saturated alicyclic hydrocarbon group has 5–6 carbon atoms and represents, for example, 1,4-cyclohexylene, 1,3-cyclohexylene, 1,2-cyclohexylene, 1,3-cyclopentylene or 1,2-cyclopentylene.

The divalent aromatic hydrocarbon group has 6–10 carbon atoms and represents, for example, 1,4-phenylene, 1,3-phenylene, 1,2-phenylene, 2,6-naphthylene, 2,5-naphthylene or 3,5-naphthylene.

The hydrocarbon group formed by binding the above mentioned groups and having 2–20 carbon atoms represents, for example, 1,4-phenylenemethylene, 1,3-phenylenemethylene, 1,2-phenylenemethylene, 1,3-phenylene-1,3-propylene, 1,3-phenylene-1,2-propylene or 1,4-phenyleneethylene.

Of these, 1,4-phenylenemethylene or 1,4-phenyleneethylene is preferred.

These hydrocarbon groups may be substituted with a group selected from a halogen atom such as F, Br, Cl and I and lower alkyloxy group such as methoxy, ethoxy and butoxy group. The number of these substituents may be between 1 and 3. As examples of the hydrocarbon group having such substituent that may be mentioned 3-butoxy-1,2-propylene and 3-chloro-1,2-propylene.

The above mentioned hydrocarbon group may be substituted with 1 or 2 group Xs. As for these hydrocarbon groups expressed by the formula -Y-X having more than one group X, there are preferably mentioned 1,3-dimethacryloyloxy-2-propyl, and triacryloyloxyneopentyl.

As for Y, there is mentioned secondly a group expressed by the formula —R$_{11}$(—O—R$_{11m1}$)— or the group —R$_{11}$(—O—R$_{11m1}$)— which is further bound with the saturated alicyclic group or the aromatic group mentioned above, in which R$_{11}$ represents a straight chain or branched alkylene group having 2–4 carbon atoms and m$_1$ is 1–20.

R$_{11}$ preferably represents ethylene, 1,2-propylene or butylene.

m$_1$ is an integer of 1–20, and preferably 1–10, more preferably 1–5, from the viewpoint of heat resistance.

As for the group formed by binding further with the saturated alicyclic group or the aromatic group, there is mentioned, for example

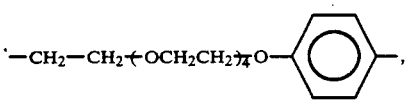

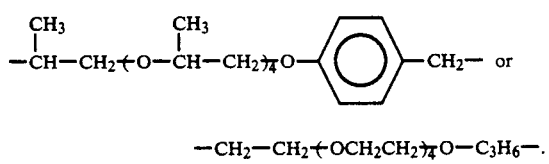

As for Y, there is mentioned thirdly a group expressed by the formula

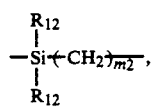

wherein R$_{12}$ represents a hydrocarbon group having 1–6 carbon atoms and m$_2$ is an integer of 1–20. R$_{12}$ preferably represents methyl, ethyl or phenyl group. m$_2$ is 1–20, preferably 1–10, most preferably 1–5. As examples, there are mentioned

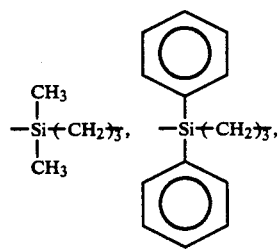

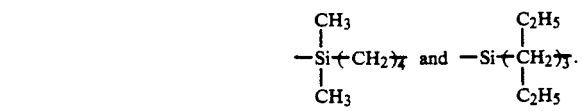

Lastly as for the Y, there is mentioned a group expressed by the formula

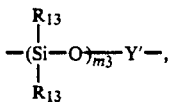

wherein $R_{13}$ represents the same as defined for $R_{12}$, $m_3$ is the same as defined for $m_1$ and $Y'$ or a group selected from the group (1), (2) and (3) in the definition of Y above mentioned.

As for such type of Y, there are mentioned

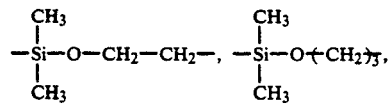

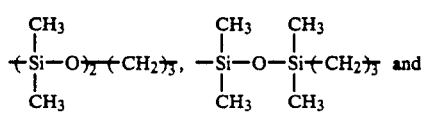

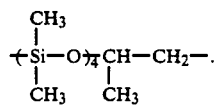

Y is limited to represent only phenylene, when X represents $-CH=CH_2$.

$R_1$, $R_2$, $R_3$ and $R_4$ are identical or different and represent hydrogen atom or each is straight chain or branched, alkyl, alkoxy or alkylsilyl group, each having 1-18 carbon atoms.

As for R1-R4, tert-butyl, tert-heptyl, tert-amyl, n-octyl, n-butoxy, n-dodecoxy and trimethylsilyl group are exemplified, and tert-butyl, tert-amyl and n-butoxy are preferred.

n is 1-4, preferably 1-2.

Accordingly, the preferred naphthalocyanine based compound according to the invention is the compound expressed by the formula I wherein the group Y is selected from the group consisting of

(11) a divalent saturated aliphatic hydrocarbon group having 1-10 carbon atoms, divalent aromatic hydrocarbon group having 6-10 carbon atoms and divalent hydrocarbon group formed by binding the above mentioned groups with each other and having 2-20 total carbon atom, each optionally substituted with a halogen atom; which may be substituted with 1 or 2 substituents of X;

(12) a group expressed by the formula $-R_{1-}$$_{1+}O-R_{11}+_{m11}-$ or the group $-R_{11}+O-R_{1-}$$_{1+m11}-$ which is further bound with the saturated aliphatic hydrocarbon group or the aromatic hydrocarbon group defined in above (11); in which $R_{11}$ represents the same as defined above, and $m_{11}$ is an integer of 1-10;

(13) a group expressed by the formula

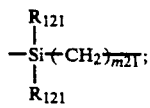

wherein $R_{121}$ represents methyl, ethyl, propyl or phenyl group, and $m_{21}$ is an integer of 2-10; and

(14) a group expressed by the formula

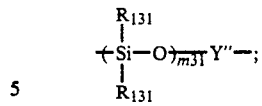

wherein $R_{131}$ represents the same as defined for $R_{121}$, $m_{31}$ is the same as defined for $m_{11}$ and $Y''$ represents a group selected from a group (11) defined above for Y.

As for the especially preferable naphthalocyanine based compound according to the invention, there is mentioned those expressed by the formula I wherein the group Y is selected from the group consisting of a divalent saturated aliphatic hydrocarbon

(21) a divalent saturated aliphatic hydrocarbon group having 2-5 carbon atoms; which may be substituted with 1 or 2 substituents of X;

(22) a group expressed by the formula $-R_{1-}$$_{1+}O-R_{11}+_{m12}-$ wherein $R_{11}$ represents the same as defined above, and $m_{12}$ is an integer of 1-5;

(23) a group expressed by the formula

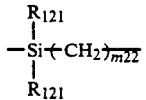

wherein $R_{121}$ represents the same as defined above, and $m_{22}$ is an integer of 2-5; and

(24) a group expressed by the formula

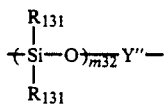

wherein $R_{131}$ and $Y''$ represent the same as defined above, and $m_{32}$ is an integer of 1-5.

X preferably represents

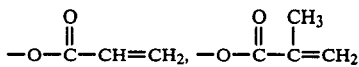

and $-CN$.

Soluble naphthalocyanines known heretofore, for example the one expressed similarly by the formula I provided that $-O-Y-X$ represents tri(n-hexyl)siloxy group (see B. L. Wheeler, J. Am. Chem. Soc. 106, 7404, 1984), can be formed into a homogeneous layer by incorporating into a nonpolar polymer such as polystyrene; however, it cannot be formed into a homogenous layer in combination with a polar polymer such as phenoxy resin.

To the contrary, the naphthalocyanine based compound expressed by the formula I according to the invention wherein X represents $-CN$ can be blended in a polar polymer and formed into a homogeneous layer.

Further, when X represents

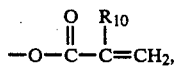

the naphthalocyanine based compound has polymerizable groups in itself. It cannot only be transformed into a polymerized layer by itself, but can also be incorporated in a polymer having an ethylenic double bond to form an extremely stable layer through crosslinking.

As for especially preferable combinations of X and Y, there are mentioned;

1. acryloyloxyalkyl such as acryloyloxyethyl,
2. methacryloyloxyalkyl such as 1-methacryloyloxy-2-propyl,
3. acryloyloxyalkylsilyl such as 3-acryloyloxypropyldimethylsilyl,
4. acryloyloxyalkoxysilyl such as acryloyloxyethoxydimethylsilyl,
5. acryloyloxyalkyl siloxysilyl such as acryloyloxypropyldimethylsiloxydimethylsilyl,
6. acryloyloxyalkyleneoxyalkyl such as acryloyltrioxyethyleneoxyethyl,
7. cyanoalkyl such as cyanoethyl,
8. cyanoalkylsilyl such as cyanopropyldimethylsilyl, and
9. cyanoalkoxysilyl such as 2-cyanoethoxydimethylsilyl.

Some example of the individual naphthalocyanine based compounds according to the invention are mentioned below;

1. Bis(2-acryloyloxyethoxy)silicon naphthalocyanine

SiNc[O(CH₂)₂OCOCH=CH₂]₂

2. Bis(2-acryloyloxy-1-propyloxy)silicon naphthalocyanine

SiNc[OCH(CH₃)CH₂OCOCH=CH₂]₂

3. Bis(2-methacryloyloxyethoxy)silicon naphthalocyanine

SiNc[OCH₂CH₂OCOC(CH₃)=CH₂]₂

4. Bis(3-methacryloyloxypropyldimethylsiloxy)-silicon naphthalocyanine

SiNc[OSi(CH₃)₂(CH₂)₃OCOC(CH₃)=CH₂]₂

5. Bis(2-acryloyloxyethoxydimethylsiloxy)silicon naphthalocyanine

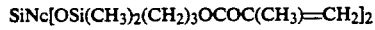
SiNc[OSi(CH₃)₂O(CH₂)₂OCOCH=CH₂]₂

5 6. Condensate of tetraethylene glycol monoacrylate with dihydroxysilicon naphthalocyanine in 2:1 ratio

SiNc[O(CH₂CH₂—O)₄—COC(CH₃)=CH₂]₂

7. Condensate of tetraethylene glycol monoacrylate with bis(dimethylchlorosiloxy)silicon naphthalocyanine in 2:1 ratio

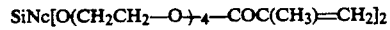
SiNc[OSi(CH₃)₂O(CH₂CH₂O=₅—COC(CH₃)=CH₂]₂

8. Bis(2-cyanoethoxy)silicon naphthalocyanine

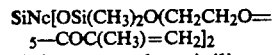
SiNc[OCH₂CH₂CH]₂

9. Bis(3-cyanopropyldimethylsiloxy)silicon naphthalocyanine

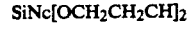
SiNc[OSi(CH₃)₂(CH₂)₃CN]₂ and

10. Bis(2-cyanoethoxydimethylsiloxy)silicon naphthalocyanine

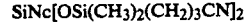
SiNc[OSi(CH₃)₂OCH₂CH₂CN]₂.

The naphthalocyanine based compound according to the invention can be produced through the process mentioned below. Dihydroxysilicon naphthalocyanine expressed by the formula (II) below:

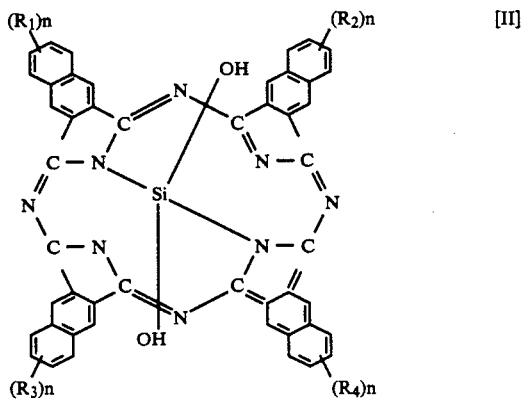

wherein R₁–R₄ and n are same as defined above which is used as a starting material can be prepared according to a known method (J. Am. Chem. Soc., 106, 7404, 1984).

(a) When Y represents the group in the group (1) and (2) of the definition of Y herein before, the compound can be prepared by a dehydration reaction as shown in the equation below:

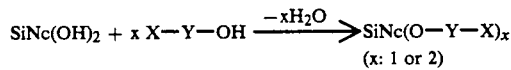
$$\text{SiNc(OH)}_2 + x\ \text{X—Y—OH} \xrightarrow{-x\text{H}_2\text{O}} \text{SiNc(O—Y—X)}_x$$
(x: 1 or 2)

One or more than one mole, preferably 2–5 moles of X—Y—OH, is usually used to one mole dihydroxysilicon naphthalocyanine, and the reaction can be carried out in a solvent such as tetraline and 1-chloronaphthalene at 200°–220° C. for 2–20 hrs under refluxing.

(b) When Y represents the group in the group (3), the compound can be synthesized by a dehydrochlorination reaction by using the dihydroxysilicon naphthalocyanine and X—Y—Cl as starting materials as below.

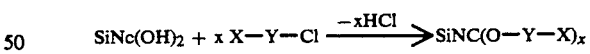
$$\text{SiNc(OH)}_2 + x\ \text{X—Y—Cl} \xrightarrow{-x\text{HCl}} \text{SiNC(O—Y—X)}_x$$

One or more than one mole, preferably 2–4 moles, of X—Y—Cl is usually used to one mole dihydroxysilicon naphthalocyanine, and the reaction may be carried out in a basic solvent such as picoline and quinoline in the presence of a high-boiling point base such as tri-n-butylamine, further in the coexistence of a polymerization inhibitor such as p-tert-butylcatechol when X represents —OCOC(R₁₀)=CH₂, at 140°–220° C. under refluxing.

(c) When Y represents the group in the group (4), the dihydroxysilicon naphthalocyanine is reacted with a dichloroalkylsilane first, and reacted with X—Y'—OH to synthesize the compound as shown in the equation below:

SiNc(OH)₂ + (CH₃)₂SiCl₂ ⟶

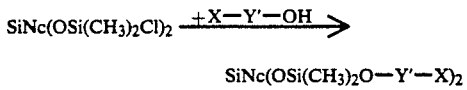

$$SiNc(OSi(CH_3)_2Cl)_2 \xrightarrow{+X-Y'-OH} SiNc(OSi(CH_3)_2O-Y'-X)_2$$

Dimethyldichlorosilane and the dihydroxysilicon naphthalocyanine in a molar ratio of more than 2:1, preferably 2—3:1 are stirred in a solvent such as pyridine for 2–20 hrs, and then X—Y'—OH is added and refluxed for 3 hrs to synthesize the compound.

The naphthalocyanine based compound according to the invention explained in detail above can be used for various applications by utilizing apparent or inherent properties thereof, for example as an organic photoconductor, non-linear optic material and an optical recording medium.

In a representative use among the uses above mentioned, the compound is incorporated in a polymeric substance to exhibit the function of absorbing light and converting it to heat, and applied as a recording layer in the optical recording medium.

As for such recording medium, there are mentioned (1) one in which a pit is formed in the recording layer by deformation caused by polymer flow under heating to record the information, (2) a so-called "overcoated organic dye-binder medium" in which an overcoat layer is arranged on the recording layer, and the overcoat layer expands with the heat generated in the recording layer to make the record, and (3) a so-called "bi-layer medium" which is composed of an expansion layer and a retention layer, the expansion layer is made of a rubbery substance which can expand with heat under laser light radiation to form a dome-like bump and the retention layer is made of a resin which can sustain this bump form, in which recording and erasing are performed by the bump-formation and the bump-disappearance.

The recording media of the type mentioned above are also described in U.S. Pat. Nos. 4,725,525, 3,475,760, 4,719,615, EP 0320834, EP 0323678, Japanese J. Appl. Phys., 22, (2), 340–343, 1983, Appl. Phys. Lett., 39, (9), 718, 1981 and J. Appl. Phys., 60, 2932 (1986).

When using the compound expressed by formula [I], wherein X represents -CN, and Y represents the group having 2-10 carbon atom in the group (1) of the definition of Y herein before, the group in the group (2) and the group having 2-10 carbon atom in the group (3) and (4), there are mentioned as a preferred polymeric substance a polymer having a relatively high polarity such as an epoxy resin, epoxy acrylate resin, acrylate resin such as polymethylmethacrylate, polyacrylic acid resin, polyvinyl alcohol, urethane resin, polyvinyl ester such as polyvinyl acetate, polycarbonate resin, polyester resin, polyamide resin, phenol resin and cellulose based resin.

When using the compound expressed by formula [I], wherein X represents —CN, and Y represents the group having about 11-20 carbon atoms in the group (1) of the definition of Y herein before and the group having about 11-20 carbon atoms in the group (3) and (4), the preferred polymeric substance is a polymer having a relatively low polarity such as a polystyrene resin, polyolefin, polyvinyl chloride, polyphenylene oxide, polybutadiene rubber, chloroprene rubber, polyvinyl butylal or polyoctadecylacrylate.

Especially when using the compound expressed by formula [I], wherein X represents —OCOC($R_{10}$)=$CH_2$ and Y represents alkylene group such as —$CH_2$—$CH_2$ and —CH($CH_3$)—$CH_2$-, Si-containing group such as —Si($CH_3$)$_2$-($CH_2$-)$_3$—, —Si($CH_3$-)$_2$—O—($CH_2$-)$_2$— and —Si($CH_3$)$_2$—O—CH($CH_3$-)$CH_2$—, or —CH$_2$—CH$_2$-(OCH$_2$CH$_2$-)$_3$— or —CH(CH$_3$-)CH$_2$-(OCH(CH$_3$-)CH$_2$-)$_8$—, there are mentioned as the preferred polymeric substance a crosslinked polymer obtained from a monomer, oligomar and/or polymer each having an ethylenic double bond-containing group such as acryl, methacryl, vinyl, vinylene, styryl and allyl group. These polymeric substance are preferred because the polymeric substance itself has a crosslinked structure, and further because the naphthalocyanine based compound mentioned above is crosslinked in the polymeric substance with the polymeric substance by forming a unit X'=OCOC($R_{10}$)—$CH_2$ and forms an extremely stable polymeric substance layer.

As for the monomer, oligomer and polymer used for the purpose mentioned above, there are a resin having methacryloyl and/or acryloyl groups and a polyfunctional methacrylate and/or acrylate compound. (Hereinafter "methacryl.....and/or acryl....." may be referred as "(meth)acryl.....").

The polyfunctional (meth)acrylates include ethylene di(meth)acrylate, tetramethylene di(meth)acrylate, trimethylolpropane tri(meth)acrylate, pentaerythritol tetra(meth)acrylate, dipentaerythritol hexa(meth)acrylate, etc. A (meth)acrylate compound expressed by the following formula

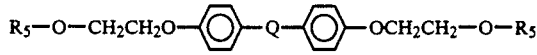

wherein $R_5$ represents (meth)acryloyl group; Q represents divalent, straight chain or branched hydrocarbon group having 1-10 carbon atoms, is also exemplified as a preferable one.

Reactivity of the (meth)acrylate compound and hardness of a polymer obtained therefrom depend on the number of the functional groups. Generally speaking, the more the number of the functional groups increases, the more the reactivity and the hardness is increased. A longer chain of an alcohol component makes the polymer softer. An acrylate usually has higher reactivity than a methacrylate.

As for the resin, an epoxy based (meth)acrylate such as epoxy (meth)acrylate and epoxy novolak (meth)acrylate and urethane (meth)acrylate resin are preferably used. The epoxy (meth)acrylate means a compound having a terminal (meth)acrylate group at the terminus of the resin and is expressed by the following formula:

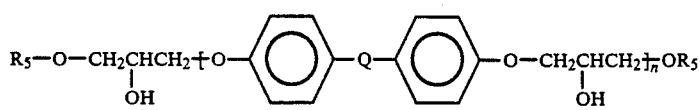

wherein $R_5$ represents (meth)acryloyl group; Q represents divalent, linear or cyclic hydrocarbon group having 1–10 carbon atoms; n is an integer of 1–20.

Q preferably represents methylene, 1,1-ethylene, 2,2-propylene, 2,2-butylene, 2,2-(4-methylpentylene) and 1,1-cyclohexylene.

The epoxy novolak (meth)acrylate means a compound expressed by the following formula:

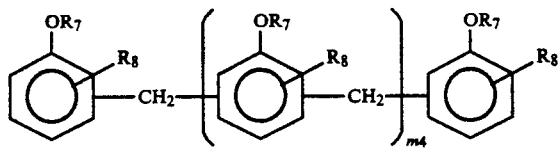

wherein $R_7$ represents a group expressed by the formula $CH_2=C(R_{10})COOCH_2CH(OH)CH_2-$, in which $R_{10}$ represents hydrogen atom or methyl group; $R_8$ represents hydrogen atom or methyl group; $m_4$ is an integer of 1–20.

The urethane (meth)acrylate means a (meth)acrylate of a polymer which 1 is a soft-segment polymer having a main chain composed of an oligomer such as a linear aliphatic polyether, aliphatic polyester, polybutadiene and polyisoprene, and having a hydroxyl group at its both end; or 2. is formed by linking the above soft-segment polymer with a diisocyanate, wherein the (meth)acryloyl group is linked via a urethane linkage.

To improve reactivity and the properties thereof, a polyfunctional (meth)acrylate can be used together. The polyfunctional (meth)acrylates used preferably are ethylene di(meth)acrylate, tetramethylene di(meth)acrylate, trimethylolpropane tri(meth)acrylate, pentaerythritol tetra(meth)acrylate, dipentaerythritol hexa(meth)acrylate, etc.

As for a preferable polymeric substance which can be incorporated with the naphthalocyanine based compound according to the invention and can constitute the expansion layer and/or retention layer of said so-called "bi-layer medium" the following substances are mentioned.

As for the polymeric substance for the layer, thermoplastic resins such as polymethyl methacrylate resin, polycarbonate resin and polyamide resin; partially crosslinked products of said thermoplastic resins; and thermosetting resin (crosslinked resin) such as epoxy resin, phenol resin, melamine resin, epoxy (meth)acrylate resin, novolak (meth)acrylate resin, and polyfunctional (meth)acrylate resin, are mentioned.

When using the naphthalocynine based compound having the (meth)acryloyl group according to the invention, UV-hardenable resins such as epoxy (meth)acrylate resin, novolak (meth)acrylate resin and polyfunctional (meth)acrylate resin are preferably used.

As for the polymeric substance for the expansion layer, natural rubbers; synthetic rubber such as styrenebutadiene rubber, butadiene rubber, isoprene rubber, nitrile rubber, chloroprene rubber, butyl rubber, ethylene-propylene rubber, urethane rubber and silicon rubber; styrene based, olefin based and urethane based thermoplastic elastomers; and amine-crosslinking, isocyanate-crosslinking and UV-crosslinking elastomers, are mentioned.

When using the naphthalocyanine based compound having the (meth)acryloyl group according to the invention, an elastic crosslinked material composed of urethane (meth)acrylate is preferably used.

The polymeric substance layer explained in detail above can contain 1–95 wt % of the naphthalocyanine based compound according to the invention. When used in a one layer type recording medium, it preferably contains 50–95 wt % of the compound. When used in a bi-layer medium, it preferably contains 1–50 wt % of the compound.

Thickness of the layer may be in a range of 50 nm–10 $\mu$m, especially 100 nm–1 $\mu$m when in the one layer type medium and 0.1 $\mu$m–5 $\mu$m when in the bi-layer medium.

The polymeric substance layer may further contain a plasticizer, polyfunctional additive, etc., to adjust the property of the polymer and a stabilizer for the dye, etc.

A high reflection layer and/or a protective layer can be placed in the medium other than the polymeric layer.

As for the high reflection layer, a thin layer of a metal or dye may be used, and preferably the thin metal layer may be used. As for the metal for the thin metal layer, aluminum, silver, platinum, gold, cobalt, titanium and nickel are mentioned. The thin metal layer may be formed by vapor deposition, sputtering, chemical plating, etc. Thickness of the layer is preferably between 20 nm and 200 nm.

The layer(s) is supported on a rigid or flexible substrate such as a disc, film, etc. of glass, polycarbonate resin, polyester resin, epoxy resin, PMMA resin, poly-4-methyl-pentene-1 resin, etc., since the layer(s) is not self-sustainable.

The optical recording medium according to the invention can be prepared basically by coating and forming the polymeric substance layer containing the compound according to the invention on the substrate.

Any coating method can be used; however, a spin-coat method, casting method, bar-coat method, doctor-knife method, gravure-coat method, etc., are preferably used.

Preferable solvents to be used are aliphatic hydrocarbons such as hexane, heptane, cyclohexane, etc.; aromatic hydrocarbons such as benzene, toluene, xylene, etc.; alcohols such as methanol, ethanol, butanol, etc.; haloalkanes such as chloroform, methylene chloride, etc.; esters such as ethyl acetate, butyl acetate, etc; ketones such as acetone, methyl ethyl ketone, methyl isobutyl ketone, cyclohexanone, etc.; glimes such as ethylene glycol monomethyl ether, ethylene glycol monoethyl ether, ethylene glycol monobutyl ether, etc.; ethers such as ether, tetrahydrofuran, dioxane, etc.; nitromethane; acetonitrile; and a mixture thereof.

Especially when using the naphthalocyanine based compound having a $-OCOC(R_{10})=CH_2$ group according to the invention, it may be preferably subjected further to curing after coating. For curing, thermo-setting and UV-hardening are preferably employed. Thermo-setting is customary carried out by heating in the presence of a radical initiator to effect three-dimensional crosslinking. UV-hardening is carried out by radiating ultraviolet rays in the presence of a photoinitiator.

Any radical initiator may be used; however, azobisisobutyronitrile (AIBN), benzoyl peroxide (BPO), cumene hydroperoxide, dicumyl peroxide, tert-butyl hydroperoxide, lauroyl peracid, etc., are preferably mentioned. Heating is effected generally at 50°–150° C., preferably 70°–120° C.

Any photoinitiator can be used in the UV-hardening, however, benzophenone based initiators such as benzophenone, Michler's ketone, etc.; diketone based initiators such as benzyl, phenylmethoxy diketone, etc.; benzoin based initiators such as benzoin ethyl ether, benzyl dimethyl ketal, etc.; thioxanthone based initiators such as 2,4-diethylthioxanthone, etc.; and quinone based initiators such as 2-methylanthraquinone, camphorquinone, etc., are preferred. An accelerator such as an amine based accelerator can be used together if desired. An amount of the initiator to be used is between 0.1 and 10 phr, preferably between 0.5 and 5 phr. The ultraviolet rays to be used are those from a low-pressure mercury lamp, moderate-pressure mercury lamp, high-pressure mercury lamp, metal halide lamp, etc. A power of the light source is preferably employed in a range of 1 mW/cm$^2$–1 kW/cm$^2$. A radiation period depends on the power of the light source and the rate of photo-reaction; however it is generally between 1 sec and 1 hr, preferably 10 sec and 10 min. The UV-hardening method is more preferable since the crosslinking and hardening can be achieved at lower temperature and higher speed.

When forming the information storage layer composed solely of the dye, the dye is dissolved in a suitable solvent and coated on a substrate by a spin-coat method, for example, and dried to remove the solvent to form the layer with a thickness of about 50 nm–200 nm, according to the teaching mentioned above.

EXAMPLE 1

Figure 1:
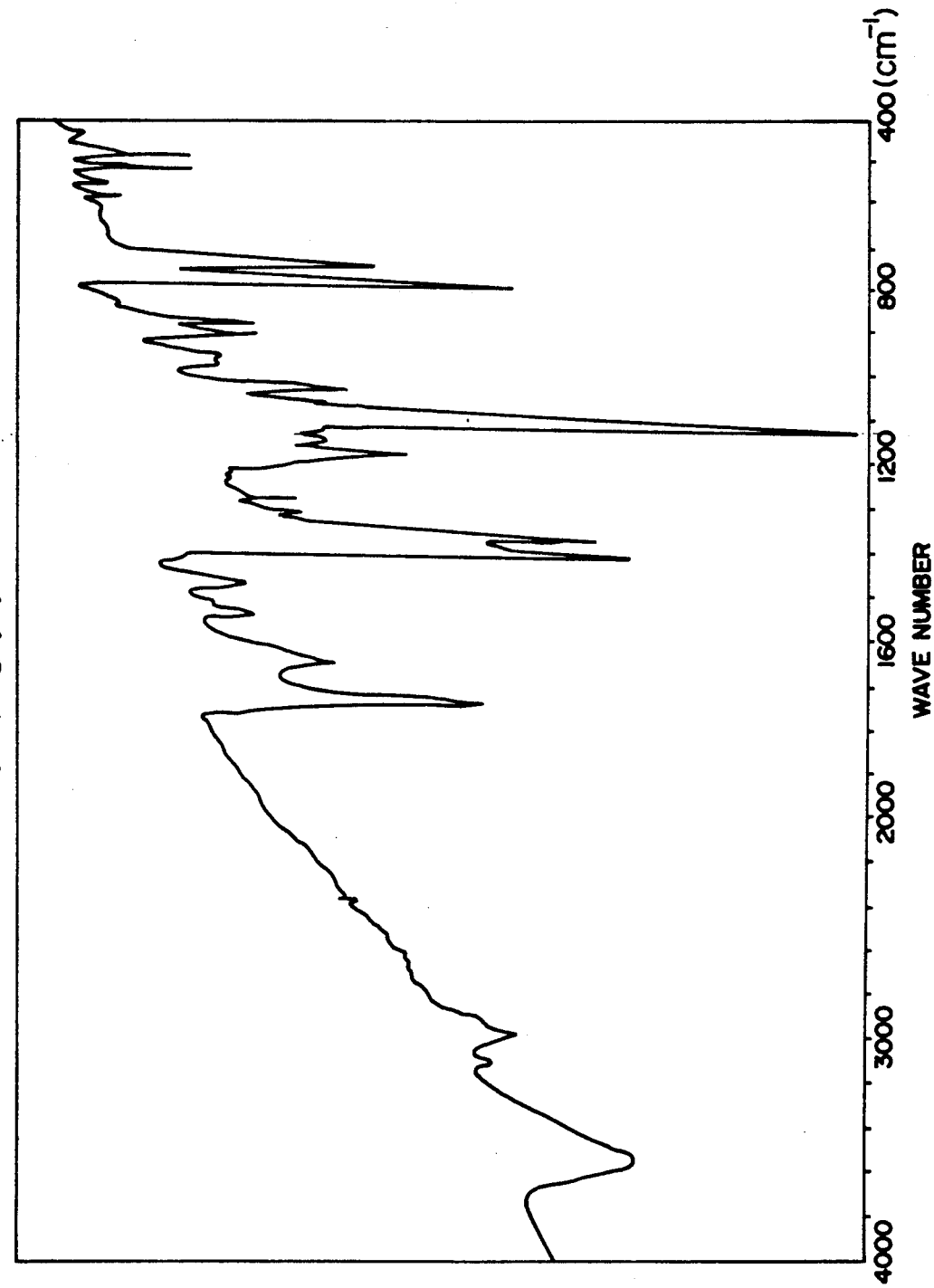
FIG. 1 shows a IR spectrum of bis(2-methacryloyloxyethoxy)silicon naphthalocyanine.

1 g ($1.29 \times 10^{-3}$ mol) of dihydroxysilicon naphthalocyanine, 1.7 g ($1.3 \times 10^{-2}$ mol) of 2-hydroxyethyl methacrylate and 16 mg of p-tert-butyl catechol were dissolved in 40 ml of tetralin, and the resulting solution was refluxed for 2 hr. After cooling to room temperature, an insoluble material was removed by filtration. The filtrate was concentrated and reprecipitated with hexane to afford a green powdery product. The powder was dissolved in chloroform, subjected to silica gel column chromatography and eluted using chloroform as a developing solvent. An obtained green solution was concentrated and dried to afford 600 mg of green powder (yield 47%). This green powder was identified as bis(2methacryloyloxyethoxy)silicon naphthalocyanine from the analysis as shown below:

(a) IR spectrum (KBr, see FIG. 1)
  2626 cm$^{-1}$ ($\nu$CH), 1716 cm$^{-1}$ ($\nu$C=O),
  1627 cm$^{-1}$ ($\nu$C=C),
  1084 cm$^{-1}$ (naphthalocyanine ring),
  1014 cm$^{-1}$ ($\nu$Si—O)

Figure 2:
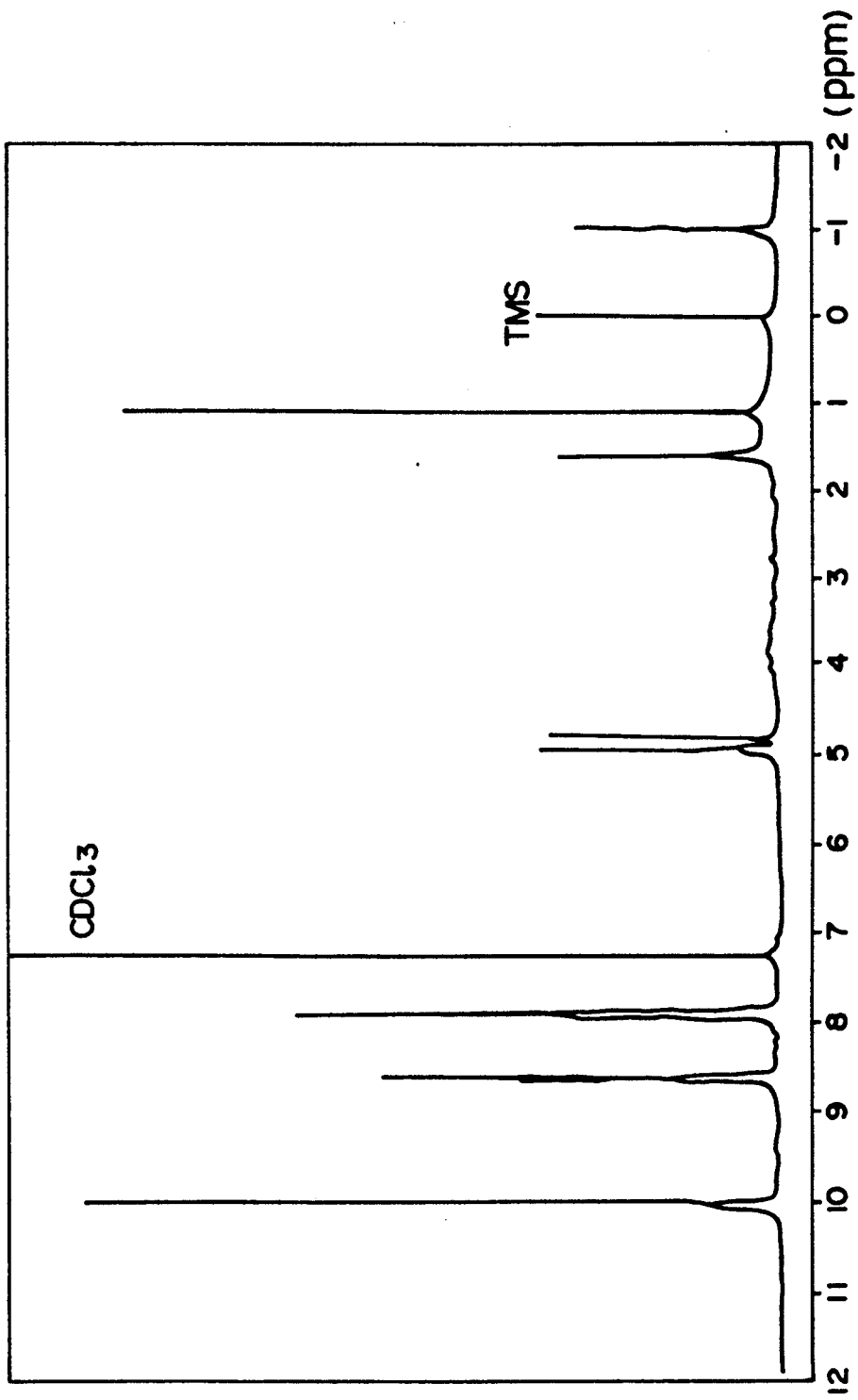
FIG. 2 shows a NMR spectrum of bis(2-methacryloyloxyethoxy)silicon naphthalocyanine.

(b) H$^1$ NMR spectrum (ppm, CDCl$_3$, see FIG. 2)
  $\delta$value: 10.02(8H), 8.62(8H), 7.93(8H), 4.95(2H), 4.84(2H), 1.63(4H), 1.12(6H), −0.97(4H).

Figure 3:
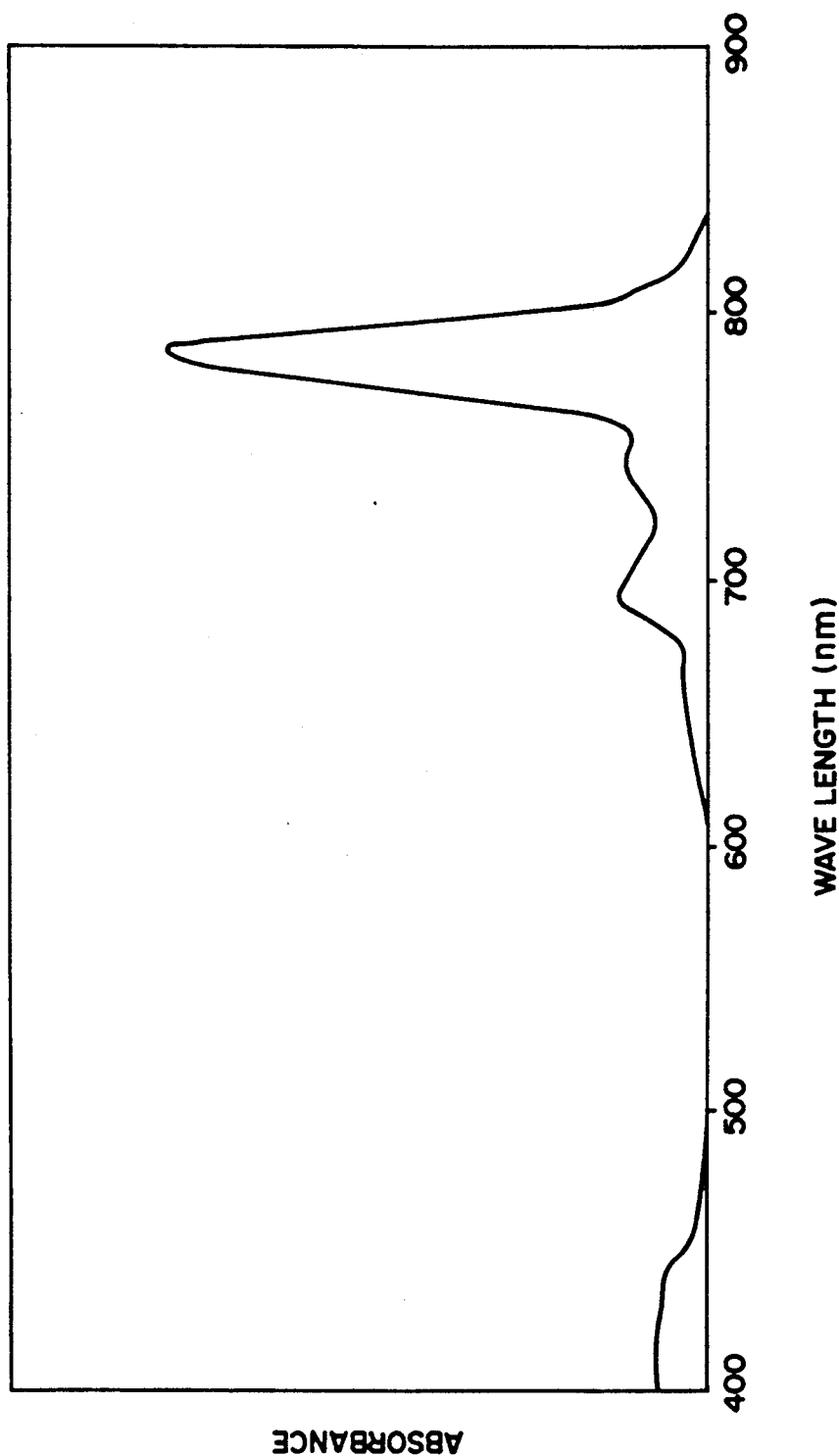
FIG. 3 shows a near infrared-ultraviolet ray absorbance spectrum of bis(2-methacryloyloxyethoxy)silicon naphthalocyanine.

(c) Near infra-ultraviolet absorbance spectrum (CHCl$_3$, see FIG. 3)
  $\lambda_{max}$: 782 nm $\epsilon$=4.0×10$^5$ l·mol$^{-1}$·cm$^{-1}$.

EXAMPLE 2

Figure 4:
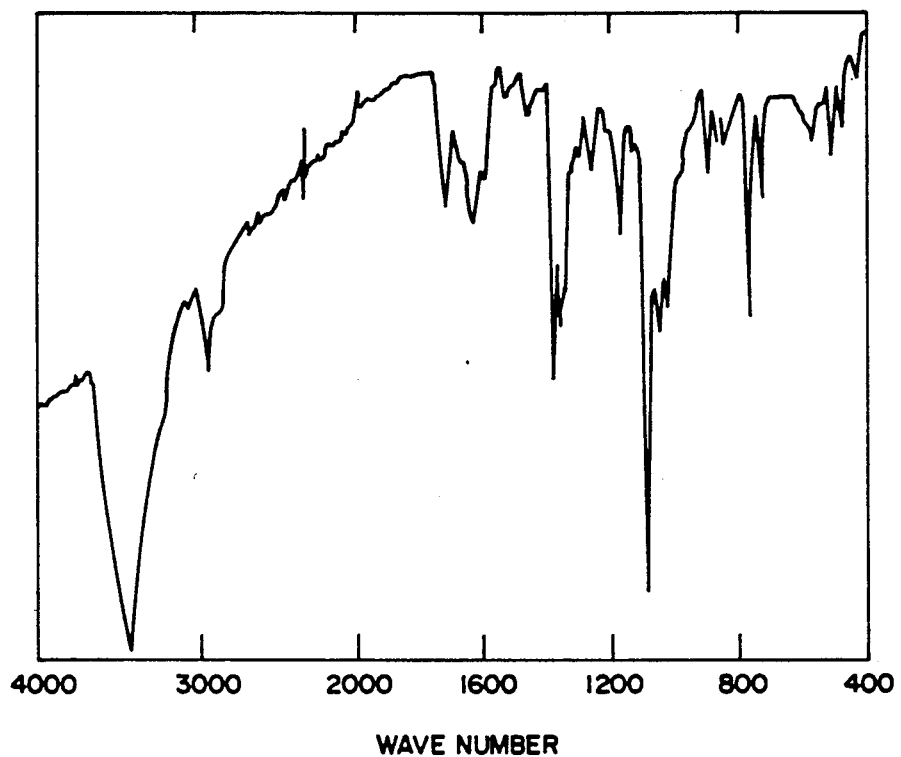
FIG. 4 shows an IR spectrum of bis(3-methacryloyloxypropyldimethylsiloxy)silicon naphthalocyanine.

A $\mu$-picoline solution (35 ml) of 300 mg ($3.8 \times 10^{-4}$ mol) of dihydroxysilicon naphthalocyanine, 850 mg ($3.8 \times 10^{-3}$ mol) of 3-methacryloyloxypropyl dimethylchlorosilane, 1 ml of tri-n-butylamine and 0.1 mg of p-tert-butyl cathecol was refluxed for 12 hr. After cooling to room temperature, an insoluble substance was removed by filtration. A filtrate was added with 100 ml of water/ethanol (=2/1) mixture, and a precipitate was filtered and washed well with ethanol. This precipitate was dissolved in chloroform, subjected to silica gel column chromatography and eluted using chloroform as a developing solvent. An obtained green solution was concentrated and dried to afford 176 mg of green powder. This green powder was identified as bis(3-methacryloyloxypropyldimethylsiloxy)silicon naphthalocyanine from the analysis as shown below:

(a) IR spectrum (KBr, see FIG. 4)
  2923 cm$^{-1}$ ($\nu$CH), 1711 cm$^{-1}$ ($\nu$C=O)
  1627 cm$^{-1}$ ($\nu$C=C), 1250 cm$^{-1}$ ($\nu$Si—C)
  1085 cm$^{-1}$ (naphthalocyanine ring),
  1040 cm$^{-1}$ ($\nu$Si—O)

Figure 5:
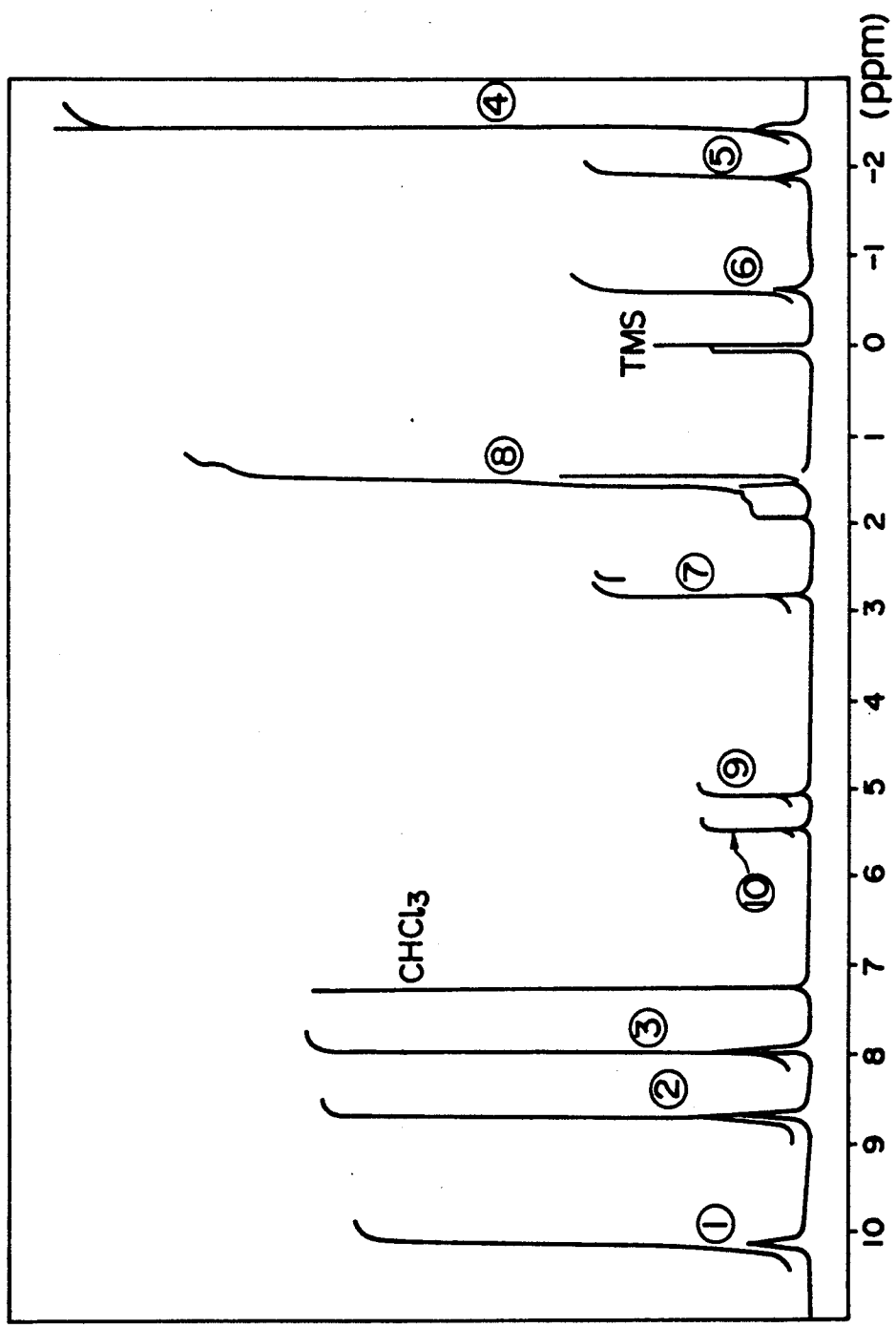
FIG. 5 shows an NMR spectrum of bis(3-methacryloyloxypropyldimethylsiloxy)silicon naphthalocyanine.

(b) NMR spectrum (ppm, CDCl$_3$, see FIG. 5)
  $\delta$ value: 10.11 (8H), 8.67 j(8H), 7.93 j(8H), 5.45 (2H), 5.08(2H), 2.82(4H), 1.49 (6H), −0.64(4H), −1.91(4H), −2.48(12H).

Figure 6:
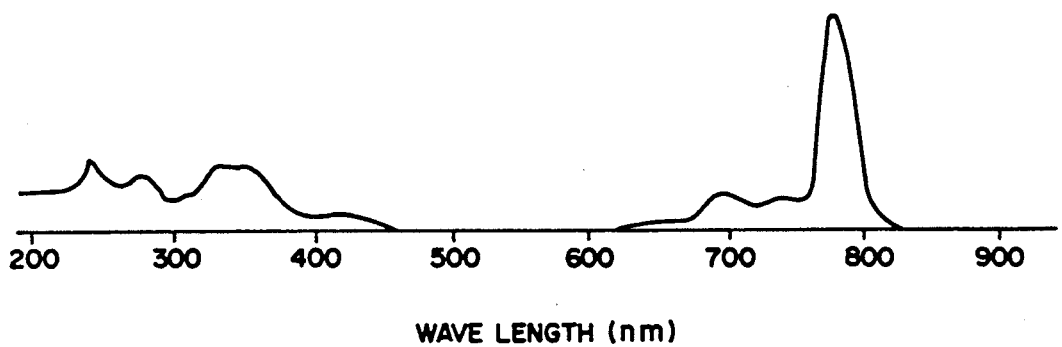
FIG. 6 shows a UV-VIS absorbance spectrum of bis(3-methacryloyloxypropyldimethylsiloxy)silicon naphthalocyanine.

(c) Near infrared-ultraviolet absorbance spectrum (CHCl$_3$, see FIG. 6)
  $\lambda_{max}$: 778 nm $\epsilon$=4.7×10$^5$ l·mol$^{-1}$·cm$^{-1}$.

EXAMPLE 3

Figure 7:
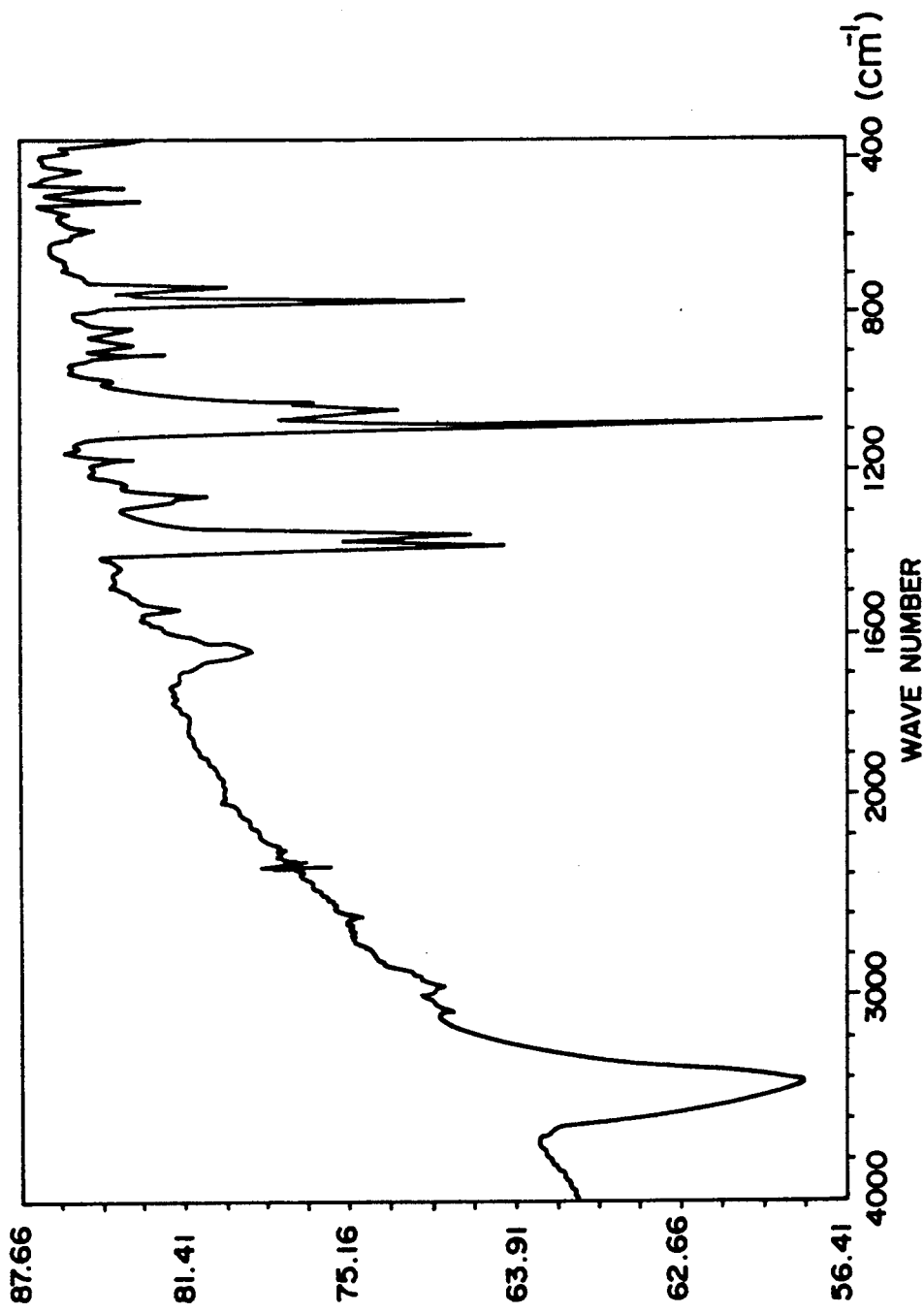

980 mg ($1.25 \times 10^{-3}$ mol) of dihydroxysilicon naphthalocyanine, 5.56 g (3.4 x 10-2 mol) of 3-cyanopropyldimethylchlorosilane, 5 ml of absolute tri-n-butylamine and 100 ml of absolute picoline were refluxed at 140°–150° C. for 20 hr under a nitrogen atmosphere. After cooling to room temperature, an insoluble substance was removed by filtration. A filtrate was added with 100 ml of water/ethanol (=2/1) mixture to form a precipitate, which was filtered and washed well with ethanol. The precipitate was then dissolved in chloroform, subjected to silica gel column chromatography and eluted using chloroform as a developing solvent. An obtained green solution was concentrated and dried to afford 380 mg (yield 30%) of green powder. This green powder was identified as bis(3-cyanopropyldimethylsiloxy)silicon naphthalocyanine from the analysis as shown below:

(a) IR spectrum (mixed pellet with KBr, see FIG. 7)
  2920 cm−1 ($\nu$CH), 2956 cm−1 ($\nu$CN),
  1376, 1350 cm$^{-1}$, 1250 cm−1 ($\delta$Si—C),
  1085 cm$^{-1}$ (naphthalocyanine ring),
  1040 cm$^{-1}$ ($\nu$Si—O)

(b) H$^1$-NMR spectrum (ppm, CDCl$_3$, see FIG. 8)
  $\delta$ value: 10.14 (8H), 8.69 (8H), 7.95 (8H), 0.89 (4H), −0.64 (4H), −1.74 (4H), 1.49 (6H), −0.64 (4H), −1.91 (4H), −2.48 (12H).

(c) Near infrared-visible absorbance spectrum (CHCl$_3$, see FIG. 9)
  $\lambda_{max}$: 775 nm $\epsilon$=2.72×10$^5$ l·mol$^{-1}$·cm$^{-1}$

EXAMPLE 4

1.02 g ($1.30 \times 10^{-3}$ mol) of dihydroxysilicon naphthalocyanine and 4.50 g (6.34 x 10-2 mol) of 2-cyanoethanol were dispersed in 50 ml of 1-chloronaphthalene and stirred at 210-220° C for 20 hr under a nitrogen atmosphere. After cooling the reaction mixture to room temperature, an insoluble substance was removed by filtration. The 1-chloronaphthalene in the filtrate was distilled off with an evaporator, then 100 ml of water/ethanol (=2/1) mixture were added thereto to form a precipitate, which was filtered and washed well with ethanol. The obtained precipitate was dissolved in chloroform, subjected to silica gel column chromatography and eluted using a chloroform/acetone (1:1 in volume ratio) mixture as a developing solvent. An obtained green solution was concentrated and dried to afford 50 mg (yield 32.9%) of green powder. This green powder was identified as bis(2-cyanoethoxy)silicon naphthalocyanine from the spectrums of NMR, Mass spectrography, IR and visible ray absorption analysis.

(a) IR spectrum (KBr)
2958 cm$^{-1}$ ($\nu$CH), 2254 cm$^{-1}$ ($\nu$CH),
1085 cm$^{-1}$ (naphthalocyanine ring),
1014 cm$^{-1}$ ($\nu$SiO)

(b) H$^1$-NMR spectrum (ppm, CDCl$_3$)
$\delta$ value: 10.12 (8H), 8.68 (8H), 7.95 (8H), −0.14 (4H), −0.97 (4H)

(c) Near infrared-visible absorbance spectrum (CHCl$_3$)
$\lambda_{max}$: 788 nm $\delta = 2.0 \times 10^5 1 \cdot \text{mol}^{-} \cdot \text{cm}^{-1}$

EXAMPLE 5

150 ml of pyridine after dehydration distillation and 10 ml of tri-n-butylamine (dehydrated by distillation with an addition of KOH) were introduced into a three necked flask equipped with a reflux condenser and the water content in the system was decreased to under 300 ppm, 2.01 g (2.7×10$^{-3}$ mol) of dihydroxysilicon naphthalocyanine and 10.0 g (7.8×10$^{-2}$ mol) of dimethyldichlorosilane were added thereto. After stirring at room temperature for 18 hr, the unreacted dimethyldichlorosilane was removed from the system by heating. The system was cooled to room temperature, added with 3.5 g (4.9×10$^{-2}$ mol) of 2-cyanoethanol and stirred for 3 hr while refluxing.

The reaction mixture was cooled to room temperature and filtered and then the pyridine was distilled off with an evaporator. A remaining oily substance was introduced into 1 l of water/ethanol (1:1 volume ratio) to form a green precipitate. The precipitate was filtered, dissolved in chloroform and filtered again. The filtrate was concentrated and fractionated with silica gel column chromatography (elution liquid : chloroform/acetone =95/5 volume ratio). The obtained green powder was identified as bis(2-cyanoethoxydimethylsiloxy)silicon naphthalocyanine from the spectrums of NMR, IR and visible ray absorption analysis (yield 54%).

(a) IR spectrum (KBr)
2958 cm$^{-1}$ ($\nu$CH), 2245 cm$^{-1}$ ($\nu$CN),
1085 cm$^{-1}$ (naphthalocyanine ring),
1014 cm$^{-1}$ ($\nu$SiO)

(b) H$^1$-NMR spectrum (ppm, CDCl$_3$)
$\delta$ value: 10.14 (8H), 8.70 (8H), 7.95 (8H), 1.45 (4H), 1.15 (4H), −2.25 (12H).

(c) Near infrared-visible absorption spectrum (CHCl$_3$)
$\lambda_{max}$: 788 nm $\delta = 2.0 \times 10^5 1 \cdot \text{mol}^{-1} \cdot \text{cm}^{-1}$

EXAMPLE 6

Except that 13 g (5.0×10$^{-2}$ mol) of tetraethylene glycol monoacrylate was used instead of 2-cyanoethanol and 80 mg of p-tert-butylacetate was added thereto, the reaction was carried out in a way same as Example 7. After cooling the reaction mixture to room temperature, it was filtered to remove an insoluble substance and the pyridine was evaporated off with an evaporator. A remaining oily substance was dissolved in chloroform and the unreacted tetraethylene glycol monoacrylate was extracted with a 1/10 N hydrochloric acid aqueous solution using a separating funnel. The chloroform solution was recovered and concentrated with the evaporator. An obtained green powder was washed with ethanol and water. The green powder was identified as a condensate of tetraethylene glycol monomethacrylate with bis(dimethylchlorosiloxy)silicon naphthalocyanine in a 2:1 ratio from IR and Near infra-red-visible absorption spectrum (yield 35%).

(a) IR spectrum (KBr)
2956 cm$^{-1}$ ($\nu$CH), 1710 cm$^{-1}$ ($\nu$CO),
1630 cm$^{-1}$ ($\nu$C=C),
1085 cm$^{-1}$ (naphthalocyanine ring),
1014 cm$^{-1}$ ($\nu$SiO)

(b) Near infrared-visible adsorption spectrum (CHCl$_3$)
$\lambda_{max}$: 777 nm $\epsilon = 2.5 \times 10^5 1 \cdot \text{mol}^{-1} \cdot \text{cm}^{-1}$

EXAMPLE 7

Each naphthalocyanine based compound obtained in Examples 1-6 was incorporated in various polymers shown in the Table below, and formed into a 1 μm thick layer on a glass plate substrate with a bar coater. Compatibility of the compound with the polymer was evaluated by micrographic study of the layer by differential interference microscopy and a transmission microscopy. The results are shown below.

| Compound | Polymer | | |
|---|---|---|---|
| | PMMA*$^1$ | epoxy resin*$^2$ | PNEA*$^3$ |
| Example 1 | Δ | x | x |
| Example 2 | o | x | x |
| Example 3 | o | o | o |
| Example 4 | o | x | x |
| Example 5 | o | Δ | Δ |
| Example 6 | Δ | o | o | o: good Δ: medium x: bad
*$^1$Polymethylmethacrylate

*$^2$ 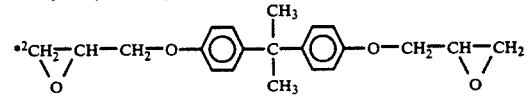

hardening agent:

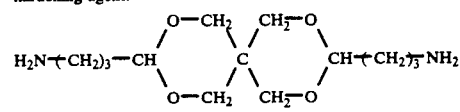

*$^3$phenol novolak epoxyacrylate

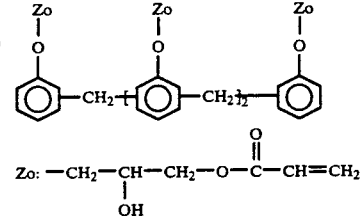

$Zo: -CH_2-\underset{\underset{OH}{|}}{CH}-CH_2-O-\overset{\overset{O}{\|}}{C}-CH=CH_2$

EXAMPLE 8

10 wt % (based on polymethyl methacrylate) of bis(3-cyanopropyldimethylsiloxy)silicon naphthalocyanine obtained in Example 3 was added to a 10 wt % polymethyl methacrylate chloroform solution to form a solution thereof. The solution was then coated on a glass plate substrate and the solvent was evaporated to form a coating of 0.7 μm thickness. The reflection at 830 nm and light resistance of this coating are shown in Table 2. The light resistance was tested by radiating Xe light of 75 mW/cm$^2$ intensity while cutting a region of less than 630 nm wavelength with a filter and evaluated with the remaining intensity of absorbance at the maximum absorbance wave length. A semiconductor laser of 10 mW output of an oscillating wave length at 780 nm was applied to the coating as a pulse signal of 1 MHz at 3 m/sec linear velocity to form a clear pit in the coating. This indicated that the coating could form a recording layer of an optical recording medium.

EXAMPLE 9

A coating was formed in the same way as in Example 8 except that bis(2-cyanoethoxy)silicon naphthalocyanine obtained in Example 4 was used instead of bis(3-cyanopropyldimethylsiloxy)silicon naphthalocyanine. The thickness of the coating was 0.9 μm. Reflection at 830 nm and light resistance of this coating are shown in Table 2. By radiating the laser light as in Example 8, a clear pit was formed in the coating, which indicated that the recording could be performed in the coating.

EXAMPLE 10

A coating was formed in the same way as in Example 8 except that bis(2-cyanoethoxydimethylsiloxy)silicon naphthalocyanine obtained in Example 5 was used instead of bis(3-cyanopropyldimethylsiloxy)silicon naphthalocyanine. The thickness of the coating was 0.7 μm. Reflection at 830 nm and light resistance of this coating are shown in Table 2. By radiating the laser light as in Example 8, a clear pit was formed in the coating, which indicated that the recording could be performed in the coating.

EXAMPLE 11

A coating was formed in the same way as in Example 8 except that bis(3-methacryloxypropyldimethylsiloxy)-silicon naphthalocyanine obtained in Example 2 was used instead of bis(3-cyanopropyldimethylsiloxy)silicon naphthalocyanine. The thickness of this coating was 0.8 μm. Reflection at 830 nm and light resistance of the coating are shown in Table 2. By radiating the laser light as in Example 8, a clear pit was formed in the coating, which indicated that the recording could be performed in the coating.

EXAMPLE 12

A 10 wt % chloroform solution of a mixture of a bisphenol A type epoxide with a bifunctional amine respectively expressed by the following formulae:

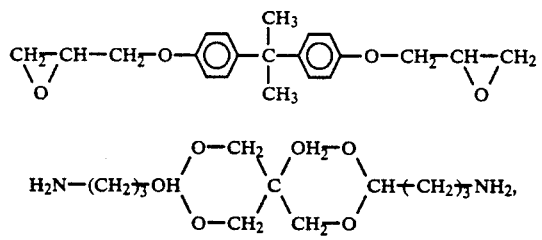

which was adjusted at an equivalent functional group ratio, was added with bis(3-cyanopropyldimethylsiloxy)-silicon naphthalocyanine in an amount of 10 wt % based on the bisphenol A type epoxide. The resulting solution was coated on a glass plate substrate and the solvent was evaporated, followed by heating at 80° C for 3 hr to form a coating of 1.0 μm thick. Reflection at 830 nm and light resistance of the coating are shown in Table 2. By radiating the laser light as in Example 8, a clear bump was formed in the coating, which indicated that the recording could be achieved.

EXAMPLE 13

A coating was formed in the same way as in Example 12 except that bis(2-cyanoethoxydimethylsiloxy)silicon naphthalocyanine obtained in Example 5 was used instead of bis(3-cyanopropyldimethylsiloxy)silicon naphthalocyanine. The thickness of the coating was 0.6 μm. Reflection at 830 nm and light resistance of the coating are shown in Table 2. By radiating the laser light as in Example 8, a clear bump was formed in the coating, which indicated that the recording could be performed.

EXAMPLE 14

In a chloroform solution of 10 wt % epoxy acrylate (I) expressed by the following formula:

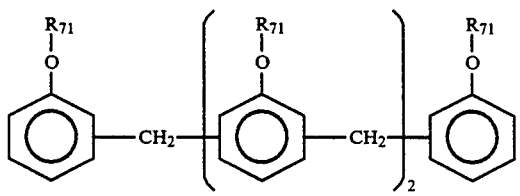

were added 3 wt % benzoin ethyl ether and 10 wt % bis(3-cyanopropyldimethylsiloxy)silicon naphthalocyanine obtained in Example 3, each based on the epoxyacrylate. The resulting solution was coated on a glass plate substrate, dried to remove the solvent off and subjected to a high pressure mercury lamp radiation of 6.2 mW/cm$^2$ radiation energy for 20 min in a nitrogen atmosphere to harden the coating. The thickness of the coating was 0.7 μm. Reflection at 830 nm and light resistance of the coating are shown in Table 2. By radiating the laser light as in Example 8, a clear bump was formed in the coating, which indicated that the recording could be performed.

EXAMPLE 15

A coating was formed in the same way as in Example 14 except that bis(2-cyanoethoxydimethylsiloxy)silicon naphthalocyanine obtained in Example 5 was used instead of bis(3-cyanopropyldimethylsiloxy)silicon naphthalocyanine. The thickness of the coating was 0.6 μm. Reflection at 830 nm and light resistance of the coating are shown in Table 2. By radiating the laser light as in Example 8, a clear bump was formed in the coating, which indicated that the recording could be performed.

EXAMPLE 16

A coating was formed in the same way as in Example 14 except that the condensate of tetraethylene glycol monomethacrylate with bis(dimethylchlorosiloxy)silicon naphthalocyanine in a 2:1 ratio obtained in Example 6 was used instead of bis(3-cyanopropyldimethylsiloxy)silicon naphthalocyanine. The thickness of the coating was 0.8 μm. Reflection at 830 nm and light resistance of the coating are shown in Table 2. By radiating the laser light as in Example 8, a clear bump was formed, which indicated that the recording could be performed.

EXAMPLE 17

In a chloroform solution of 10 wt % epoxy acrylate (II) expressed by the following formula:

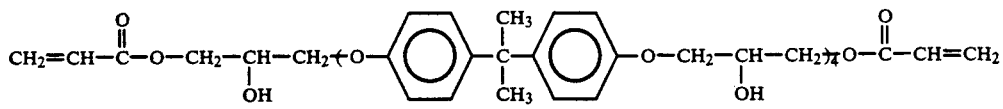

were added 3 wt % benzoin ethyl ether and a 10 wt % bis(2-cyanoethoxydimethylsiloxy)silicon naphthalocyanine obtained in Example 5, each based on the epoxy acrylate. The resulting solution was coated on a glass plate substrate, dried to remove the solvent off and subjected to a high pressure mercury lamp radiation of 6.2 mW/cm$^2$ energy for 20 min in a nitrogen atmosphere to harden the coating. The thickness of the coating was 0.8 μm. Reflection at 830 nm and light resistance of the coating are shown in Table 2. By radiating the laser light as in Example 8, a clear bump was formed, which indicated that the recording was performed.

EXAMPLE 18

A coating was formed in the same way as in Example 7 except that the condensate of tetraethylene glycol monomethacrylate with bis(dimethylchlorosiloxy)silicon naphthalocyanine in a 2:1 ratio obtained in Example 6 was added. The thickness of the coating was 0.6 μm. Reflection at 830 nm and light resistance of the coating are shown in Table 2. By radiating the laser light as in Example 8, a clear bump was formed, which indicated that the recording was performed.

COMPARATIVE EXAMPLE 1

A coating was formed in the same way as in Example 17 except that a cyanine based dye NK125 (NIPPON KANKOU SHIKISO Limited) was used instead of bis(2-cyanoethoxydimethylsiloxy)silicon naphthalocyanine. The thickness of the coating was 0.6 μm. Reflection at 830 nm and light resistance of the coating are shown in Table 2.

TABLE 2

| Example No. | Max. absorption wave length (nm) | Reflection at 830 nm (%) | Light resistance |
|---|---|---|---|
| 8 | 780 | 10 | 0.99 |
| 9 | 787 | 12 | 0.98 |
| 10 | 779 | 14 | 0.99 |
| 11 | 785 | 12 | 0.97 |
| 12 | 840 | 17 | 0.99 |
| 13 | 778 | 9 | 0.98 |
| 14 | 838 | 13 | 0.99 |
| 15 | 830 | 12 | 0.98 |
| 16 | 799 | 12 | 0.99 |
| 17 | 790 | 10 | 0.95 |
| 18 | 795 | 12 | 0.99 |
| C.E.1 | 750 | 8 | 0.12 |

EXAMPLE 19

A polyisocyanate (CORONATE-L ®; NIPPON URETHAN KOGYO Limited) was added to a liquid chloroprene rubber having a hydroxy group at its molecular terminals (FH-050, DENKIKAGAKU KOGYO Limited, numerical average molecular weight: 5,100) in a ratio of ½ of hydroxyl group/isocyanate group, and diluted with chloroform up to 5 times of volume. Into this solution is added a 10 wt % of tetrachlorododecaphenylthiophthalocyanine vanadyloxy complex, based on the solid content, and the resulting solution was coated on a glass plate substrate and dried to remove the solvent off. The glass plate was then heat-treated in a drier at 120° C. for 1 hr to harden the coating and form an expansion layer. The thickness of the layer was 2.2 μm.

A chloroform solution of 10 wt % polymethylmethacrylate (PMMA) was added with 10 wt %, based on the PMMA, of bis(3-cyanopropyldimethylsiloxy)silicon naphthalocyanine obtained in Example 3. This solution was coated on the above mentioned expansion layer and dried to remove the solvent off to form a retention layer of 0.7 μm thick. The resulting bilayer medium was subjected to semiconductor laser light radiation of a 830 nm oscillating wave length, 10 mW output as a 1 MHz pulse signal at 3 m/sec linear velocity to form a clear bump on the medium surface. Then the recorded bump was subjected to continuous radiation of the semiconductor laser light of a 780 nm oscillating wave length, 5 mW output at 3 m/sec linear velocity, whereby the bump disappeared not to be recognized by microscopic observation (×400). This indicated that the recording medium above could be used as an erasable optical recording medium. After a repeat of 10$^2$ times of this recording-erasing cycle, an ability to form the bump remained.

EXAMPLE 20

A bilayer medium was prepared in the same way as in Example 19 except that bis(2-cyanoethoxydimethylsiloxy)-silicon naphthalocyanine obtained in Example 5 was used instead of bis(3-cyanopropyldimethylsiloxy)-silicon naphthalocyanine. By laser radiation the same as in Example 19, clear bump formation and erasing were performed.

EXAMPLE 21

A bilayer medium was prepared in the same way as in Example 19 except that bis(3-methacryloyloxypropyldimethylsiloxy)silicon naphthalocyanine obtained in Example 2 was used instead of bis(3-cyanopropyldimethylsiloxy)silicon naphthalocyanine. By laser radiation the same as in Example 19, clear bump formation and erasing were performed.

EXAMPLE 22

An expansion layer was formed on a glass plate substrate in the same way as in Example 19. A chloroform solution of 10 wt % of a mixture of the biphenol A type epoxide with the bifunctional amine both mentioned in Example 12, adjusted at an equivalent functional group ratio, was added with 10 wt %, based on the bisphenol A type epoxide, bis(3-cyanopropyldimethylsiloxy)silicon naphthalocyanine. The solution was coated on the above mentioned expansion layer, dried and heated at 80° C. for 3 hr to obtain a retention layer 1.0 μm thick. The resulting bilayer medium was subjected to semiconductor laser light radiation of a 830 nm oscillating wave length, 10 mW output as a 1 MHz pulse signal at 3 m/sec linear velocity to form a clear bump on the medium surface. Then the recorded bump was subjected to the continuous radiation of the semiconductor laser light of a 780 nm oscillating wave length, 7 mW output at 3 m/sec linear velocity, whereby the bump disappeared not to be recognized by microscopic observation (×400). This indicated that the above recording medium could be used as an erasable optical recording medium. After a repeat of 10⁴ times of this recording-erasing cycle, an ability to form the bump was remained.

EXAMPLE 23

A bilayer medium was prepared in the same way as in Example 22 except that bis(2-cyanoethoxydimethylsiloxy)-silicon naphthalocyanine obtained in Example 5 was used instead of bis(3-cyanopropyldimethylsiloxy)-silicon naphthalocyanine. By the laser radiation same as in Example 22, clear bump formation and erasing were performed.

EXAMPLE 24

An expansion layer was formed on a glass plate substrate in the same way as in Example 19. Into a chloroform solution of 10 wt % of the epoxy acrylate (I) mentioned in Example 14 wee added 3 wt % of 2,2-dimethoxy-2-phenylacetophenone and 10 wt % of bis(3-cyanopropyldimethylsiloxy)silicon naphthalocyanine obtained in Example 3, both based on the epoxy acrylate (I). The resulting solution was coated on the expansion layer, dried to removed the solvent off and subjected to a high pressure mercury lamp radiation of 6.2 mW/cm² energy for 20 min in a nitrogen atmosphere to harden the coating and form a retention layer 0.9 μm thick. The resulting bilayer medium was subjected to the semiconductor laser light radiation of a 830 nm oscillating wave length, 10 mW output as a 1 MHz pulse signal at 3 m/sec linear velocity, whereby a clear bump was formed on the medium surface. Then the recorded bump was subjected to the continuous radiation of semiconductor laser light of a 780 nm oscillating wave length, 7 mW out put at 3 m/sec linear velocity, whereby the bump disappeared not to be recognized by microscopic observation (×400). This indicated that the above recording medium could be used as an erasable optical recording medium. After a repeat of 10⁴ times of this recording-erasing cycle, an ability to form the bump remained.

EXAMPLE 25

A bilayer medium was prepared in the same way as in Example 24 except that bis(2-cyanoethoxydimethylsiloxy)-silicon naphthalocyanine obtained in Example 5 was used instead of bis(3-cyanopropyldimethylsiloxy)-silicon naphthalocyanine. By the laser radiation the same as in Example 24, clear bump formation and erasing were performed.

EXAMPLE 26

A bilayer medium was prepared in the same way as in Example 24 except that the condensate of tetraethylene glycol monomethacrylate with bis(dimethylchlorosiloxy)-silicon naphthalocyanine in a 2:1 ratio obtained in Example 6 was used. By the laser radiation the same as in Example 24, clear bump formation and erasing were performed.

EXAMPLE 27

An expansion layer was formed on a glass plate substrate in the same way as in Example b 19. Into a chloroform solution of 10 wt % of the epoxy acrylate (II) mentioned in Example 17 are were added 3 wt % of 2,2-dimethoxy-2-phenylacetophenone and 10 wt % of bis(2-cyanoethoxy-dimethylsiloxy)silicon naphthalocyanine obtained in Example 5, both based on the epoxy acrylate (II). The resulting solution was coated on the expansion layer, dried to remove the solvent off and subjected to a high pressure mercury lamp radiation of 6.2 mW/cm² energy for 20 min in a nitrogen atmosphere to harden the coating and form a retention layer 0.9 μm thick. The resulting bilayer medium was subjected to the semiconductor laser light radiation of a 830 nm oscillating wave length, 10 mW output as a 1 MHz pulse signal at 3 m/sec linear velocity, whereby a clear bump was formed on the medium surface. Then the recorded bump was subjected to the continuous radiation of semiconductor laser light of a 780 nm oscillating wave length, 5 mW output at 3 m/sec linear velocity, whereby the bump disappeared not to be recognized by microscopic observation (×400). This indicated that the above recording medium could be used as an erasable optical recording medium. After a repeat of 10⁴ times of this recording-erasing cycle, an ability to form the bump remained.

EXAMPLE 28

A bilayer medium was prepared in the same way as in Example 27 except that the condensate of tetraethylene glycol monomethacrylate with bis(dimethylchlorosiloxy)-silicon naphthalocyanine in a 2:1 ratio obtained in Example 6 was used instead of bis(2-cyanoethoxydimethylsiloxy)-silicon naphthalocyanine. By the laser radiation the same as in Example 27, 10⁵ times repeat of clear bump formation and erasing were performed.

COMPARATIVE EXAMPLE 2

A bilayer medium was prepared in the same way as in Example 27 except that the NK125 mentioned above was used instead of bis(2-cyanoethoxydimethylsiloxy)-silicon naphthalocyanine. By the laser radiation the same as in Example 27, only 10¹ times repeat of recording and erasing were performed.

What we claim is:

1. A naphthalocyanine based compound expressed by the following formula (I)

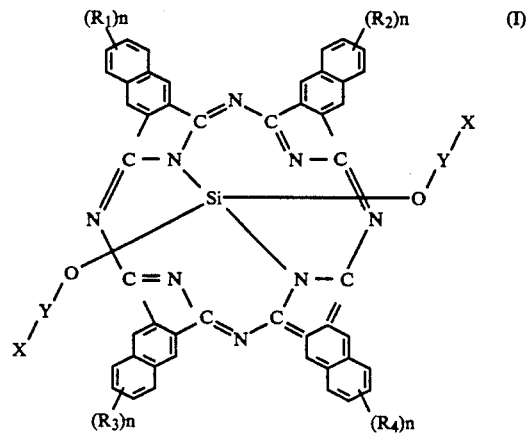

wherein

X represents a group selected from a group consisting of

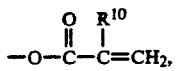

—CN, and —CH=CH$_2$; in which R$^{10}$ represents hydrogen atom or methyl group;

Y groups, which may be the same or different, each represent a divalent group selected from the group consisting of (1) a saturated aliphatic hydrocarbon group having 2-20 carbon atoms, saturated alicyclic hydrocarbon group having 5-6 carbon atoms, aromatic hydrocarbon group having 6-10 carbon atoms and hydrocarbon group formed by binding the above mentioned groups with each other and having 2-20 total carbon atoms, each optionally substituted with a Group selected from a halogen atom and lower alkyloxy group; which may be substituted with 1 or 2 substituents of X;

(2) a group expressed by the formula —R$_{1-1}$+O—R$_{11}$+$_{m1}$— or the group —R$_{11}$+O—R$_{1-1}$+$_{m1}$— which is further bound with the saturated alicyclic hydrocarbon group or the aromatic hydrocarbon group defined in above (1); in which R$_{11}$ represents straight chain or branched alkylene group having 2-4 carbon atoms and m1 is an integer of 1-20;

(3) a group expressed by the formula

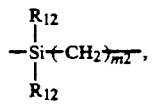

in which R$_{12}$ represents hydrocarbon group having 1-6 carbon atoms; m2 represents an integer of 1-20; and (4) a group expressed by the formula

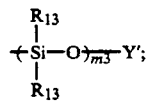

in which R$_{13}$ represents the same as defined for R$_{12}$; m3 represents the same as defined for m$_1$; Y' represents a group selected from a group consisting of (1), (2) and (3) defined above for Y; provided that Y represents phenylene group when X represents —CH=CH$_2$;

R$_1$, R$_2$, R$_3$ and R$_4$ are identical or different and represent hydrogen atom, each straight chain or branched alkyl group, alkoxy group or alkylsilyl group; each having 1-18 carbon atoms; and n represent an integer of 1-4.

2. A naphthalocyanine based compound of claim 1 expressed by the formula I wherein the group Y is selected from the group consisting of

(11) a divalent saturated aliphatic hydrocarbon group having 2-10 carbon atoms, divalent aromatic hydrocarbon group having 6-10 carbon atoms and divalent hydrocarbon group formed by binding the above mentioned groups with each other and having 2-10 total carbon atoms; each optionally substituted with a halogen atom; which may be substituted with 1 or 2 substituents of X;

(12) a group expressed by the formula —R$_{1-1}$+O—R$_{11}$+$_{m11}$— or the group —R$_{11}$+O—R$_{1-1}$+$_{m11}$— which is further bound with the saturated aliphatic hydrocarbon group or the aromatic hydrocarbon group defined in above (11); in which R$_{11}$ represents the same as defined above, and m$_{11}$ is an integer of 1-10;

(13) a group expressed by the formula

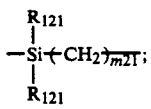

wherein R$_{121}$ represents methyl, ethyl, propyl or phenyl group, and m$_{21}$ is an integer of 2-10; and

(14) a group expressed by the formula

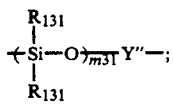

wherein R$_{131}$ represents the same as defined for R$_{121}$, m$_{31}$ is the same as defined for m$_{11}$ and Y" represents a group selected from a group (11) defined above for Y.

3. A naphthalocyanine based compound of claim 1 expressed by the formula I wheein the group Y is selected from the group consisting of

(21) a divalent saturated aliphatic hydrocarbon group having 2-5 carbon atoms; which may be substituted with 1 or 2 substituents of X;

(22) a group expressed by the formula —R$_{1-1}$+O—R$_{11}$+$_{m}$— wherein R$_{11}$ represents the same as defined above, and m$_{12}$ is an integer of 1-5;

(23) a group expressed by the formula

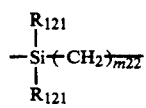

wherein R$_{121}$ represents the same as defined above, and m$_{22}$ is an integer of 2-5; and

(24) a group expressed by the formula

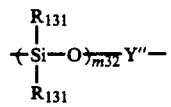

wherein R$_{131}$ and Y" represent the same as defined above, and m$_{32}$ is an integer of 1-5.

4. A naphthalocyanine based compound of claim 1, 2 or 3 characterized in that X represents —OCOC(R$_{10}$)=CH$_2$.

5. A naphthalocyanine based compound of claim 1, 2 or 3 characterized in that X represents —CN.

6. An optical recording medium composed of an information storage layer containing at least one polymeric substance layer incorporating, as an ingredient having a function to absorb a light and convert it to heat, a naphthalocyanine based compound expressed by the formula (I') below or a unit derived therefrom;

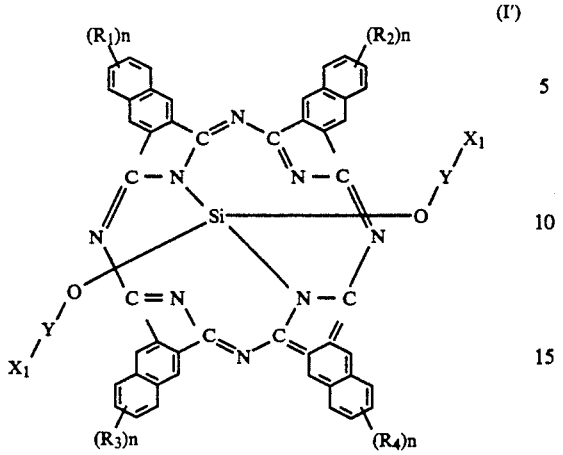

wherein
$X_1$, represents a group selected from a group consisting of

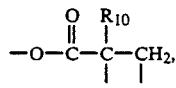

—CN, and

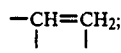

in which $R_{10}$ represents hydrogen atom or methyl group;

Y groups, which may be the same or different, each represent a divalent group selected from the group consisting of (1) a saturated aliphatic hydrocarbon group having 2-20 carbon atoms, saturated alicyclic hydrocarbon group formed by binding the above mentioned groups with each other and having 2-20 total carbon atoms; each optionally substituted with a group selected form a halogen atom and lower alkyloxy group; which may be substituted with 1 or 2 substituents of $X_1$;

(2) a group expressed by the formula —$R_{11}$—O—$R_{11}$—$_{m1}$— or the group —$R_{11}$—O—$R_{11}$—$_{m1}$— which is further bound with the saturated alicyclic hydrocarbon group or the aromatic hydrocarbon group defined in above (1); in which $R_{11}$ represents straight chain or branched alkylene group having 2-4 carbon atoms and m1 is an integer of 1-20;

(3) a group expressed b y the formula

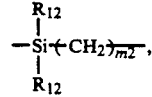

in which $R_{12}$ represents hydrocarbon group having 1-6 carbon atoms; $m_2$ represents integer of 1-20; and (4) a group expressed by the formula

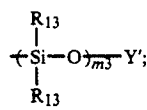

in which $R_{13}$ represents the same as defined for $R_{12}$; m3 represents the same as defined for m1; Y' represents a group selected from a group consisting of (1), (2) and (3) defined above for Y;
provided that
Y represents phenylene group when $X_1$ represents

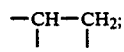

$R_1$, $R_2$, $R_3$ and $R_4$ are identical or different and represent hydrogen atom, each straight chain or branched alkyl group, alkoxy group or alkylsilyl group, each having 1-18 carbon atoms; and n represents an integer of 1-4.

7. The optical recording medium of claim 6 wheein the polymeric substance layer is a crosslinked polymeric substance layer.

8. The optical recording medium of claim 6 or 7 wheein the information storage layer contains two polymeric substance layers including at least one said polymeric substance layer.

9. The optical recording medium of claim 8 wherein the information storage layer contains two different polymeric substance layers.

10. The optical recording medium of claims 6, 7 or 9 wherein the group $X_1$, represents

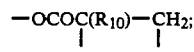

and the polymeric substance consisting the polymeric substance layer is derived by polymerization of a monomer, oligomer and/or polymer each having an ethylenic double bond.

11. The optical recording medium of claim 8 wheein the group $X_1$, represents

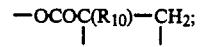

and the polymeric substance consisting the polymeric substance layer is derived by polymerization of a monomer, oligomer and/or polymer each having an ethylenic double bond.

12. A naphthalocyanine based compound of claim 1 wherein, when X represents —CN the number of carbon atoms in Y is 2-20.

* * * * *